US012576493B2

(12) United States Patent
Cooper

(10) Patent No.: US 12,576,493 B2
(45) Date of Patent: Mar. 17, 2026

(54) STAPLE APPARATUS AND METHODS FOR STAPLING

(71) Applicant: Avery Dennison Corporation, Mentor, OH (US)

(72) Inventor: William J. Cooper, Shrewsbury, MA (US)

(73) Assignee: Avery Dennison Corporation, Mentor, OH (US)

( * ) Notice: Subject to any disclaimer, the term of this patent is extended or adjusted under 35 U.S.C. 154(b) by 676 days.

(21) Appl. No.: 17/778,558

(22) PCT Filed: Oct. 21, 2020

(86) PCT No.: PCT/US2020/056670
§ 371 (c)(1),
(2) Date: May 20, 2022

(87) PCT Pub. No.: WO2021/112965
PCT Pub. Date: Jun. 10, 2021

(65) Prior Publication Data
US 2023/0032034 A1 Feb. 2, 2023

Related U.S. Application Data

(60) Provisional application No. 62/942,363, filed on Dec. 2, 2019.

(51) Int. Cl.
*B25C 5/16* (2006.01)
*B25C 5/02* (2006.01)

(52) U.S. Cl.
CPC .......... *B25C 5/1627* (2013.01); *B25C 5/0228* (2013.01)

(58) Field of Classification Search
None
See application file for complete search history.

(56) References Cited

U.S. PATENT DOCUMENTS 1,581,288 A 4/1926 Polzer
2,296,493 A * 9/1942 Bernstein .............. B25C 5/1627 227/138
(Continued)

FOREIGN PATENT DOCUMENTS

CN 1394721 2/2023
DE 2148418 4/1972
(Continued)

OTHER PUBLICATIONS

International Search Report and Written Opinion dated May 11, 2021 issued in corresponding IA No. PCT/US2020/056670 filed Oct. 21, 2020.
(Continued)

*Primary Examiner* — Tanzim Imam

(57) ABSTRACT

A staple apparatus can comprise a staple head movable in a first staple direction from a head retracted position to a head extended position. The staple apparatus can further comprise an indexing apparatus comprising an index biasing member and an indexing member. The indexing member can be positioned at least partially within an indexing area and biased with the index biasing member toward a member extended position relative to the indexing area. The indexing member can define a rung travel path and can further comprise an indexing tab comprising a ramp surface positioned to taper the rung travel path in the first indexing direction. The indexing tab can further comprise a shoulder positioned past at least a portion of the ramp surface in the first indexing direction. In further embodiments, a staple chain positioning apparatus can comprise a push member movable in an extension direction.

52 Claims, 18 Drawing Sheets

(56) References Cited

U.S. PATENT DOCUMENTS

| | | | | |
|---|---|---|---|---|
| 3,650,451 | A | 3/1972 | Weiland et al. | |
| 5,927,922 | A | 7/1999 | Miller | |
| 5,934,504 | A * | 8/1999 | Elliott | B25C 1/006 221/238 |
| 6,685,077 | B1 | 2/2004 | Davignon et al. | |
| 6,978,698 | B2 * | 12/2005 | Hofbrucker | B25B 23/06 227/114 |
| 2003/0000992 | A1 | 1/2003 | Borjesson et al. | |
| 2008/0048001 | A1 * | 2/2008 | Shor | B25C 5/1693 227/147 |
| 2008/0190956 | A1 | 8/2008 | Earley et al. | |
| 2010/0258608 | A1 | 10/2010 | Porth et al. | |
| 2012/0227256 | A1 | 9/2012 | Clew et al. | |
| 2015/0041517 | A1 * | 2/2015 | Liu | B25C 1/08 227/136 |
| 2017/0275129 | A1 * | 9/2017 | Takahashi | B25C 5/04 |
| 2018/0178454 | A1 | 6/2018 | Cooper et al. | |

FOREIGN PATENT DOCUMENTS

| | | |
|---|---|---|
| EP | 1666209 | 5/2008 |
| EP | 2835225 | 2/2015 |
| JP | 2010-530315 | 9/2010 |
| JP | 2017-196729 | 11/2017 |
| KR | 10-2012-0102672 | 9/2012 |
| WO | 2008/057322 | 5/2008 |
| WO | 2008/156950 | 12/2008 |
| WO | 2013/025681 | 2/2013 |
| WO | 2017/183730 | 10/2017 |

OTHER PUBLICATIONS

International Preliminary Report on Patentability dated May 17, 2022 issued in corresponding IA No. PCT/US2020/056670 filed Oct. 21, 2020.

Invitation to Pay Additional Fees dated Mar. 19, 2021 issued in corresponding IA No. PCT/US2020/056670 filed Oct. 21, 2020.

* cited by examiner

STAPLE APPARATUS AND METHODS FOR STAPLING

CROSS-REFERENCE TO RELATED APPLICATION

The present application is a 371 of International Application No. PCT/US2020/056670, which was published in English on Jun. 10, 2021, and claims the benefit of U.S. Provisional Patent Application No. 62/942,363 filed Dec. 2, 2019, both of which are incorporated herein by reference in their entireties.

FIELD OF THE INVENTION

The present disclosure relates generally to staple apparatus and methods for stapling and, more particularly, to stapling apparatus configured to linearly feed a staple chain and methods of linearly feeding a staple chain with a staple apparatus.

BACKGROUND

Staple apparatus are known to utilize a rotating wheel to engage a staple chain and a feed pawl and ratchet system to advance the staple chain in the staple apparatus. Such systems may sometimes experience failure of the feed mechanism when feeding a staple chain with the staple apparatus. Accordingly, improvements may be made over existing systems to reduce the occurrence of such failures.

SUMMARY

The following presents a simplified summary of the disclosure to provide a basic understanding of some embodiments described in the detailed description.

In accordance with some embodiments, a staple apparatus can comprise a staple head movable in a first staple direction from a head retracted position to a head extended position. The staple apparatus can further comprise an indexing apparatus comprising an index biasing member and an indexing member. The indexing member can be positioned at least partially within an indexing area and biased with the index biasing member toward a member extended position relative to the indexing area. The indexing member can be movable in a first indexing direction from the member extended position to a member retracted position relative to the indexing area. The first indexing direction can comprise a directional component comprising the first staple direction. The indexing member can define a rung travel path and can further comprise an indexing tab comprising a ramp surface positioned to taper the rung travel path in the first indexing direction. The indexing tab can further comprise a shoulder positioned past at least a portion of the ramp surface in the first indexing direction.

In accordance with some embodiments, an indexing apparatus for indexing a staple chain can comprise a support member, an index biasing member, and an indexing member positioned at least partially within an indexing area and biased with the index biasing member toward a member extended position relative to the indexing area. The indexing member can be movable in a first indexing direction from the member extended position to a member retracted position relative to the indexing area. The indexing member can define a rung travel path and can further comprise an indexing tab comprising a ramp surface positioned to taper the rung travel path in the first indexing direction. The indexing tab can further comprise a shoulder positioned past at least a portion of the ramp surface in the first indexing direction.

In accordance with some embodiments, a staple chain positioning apparatus can comprise a push member movable in an extension direction and a slide member configured to slide in a slide direction transverse to the extension direction. An interface between the slide member and the push member can cause movement of the push member in the extension direction in response to movement of the slide member in the slide direction. The interface can comprise an interface protrusion positioned within the interface slot.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
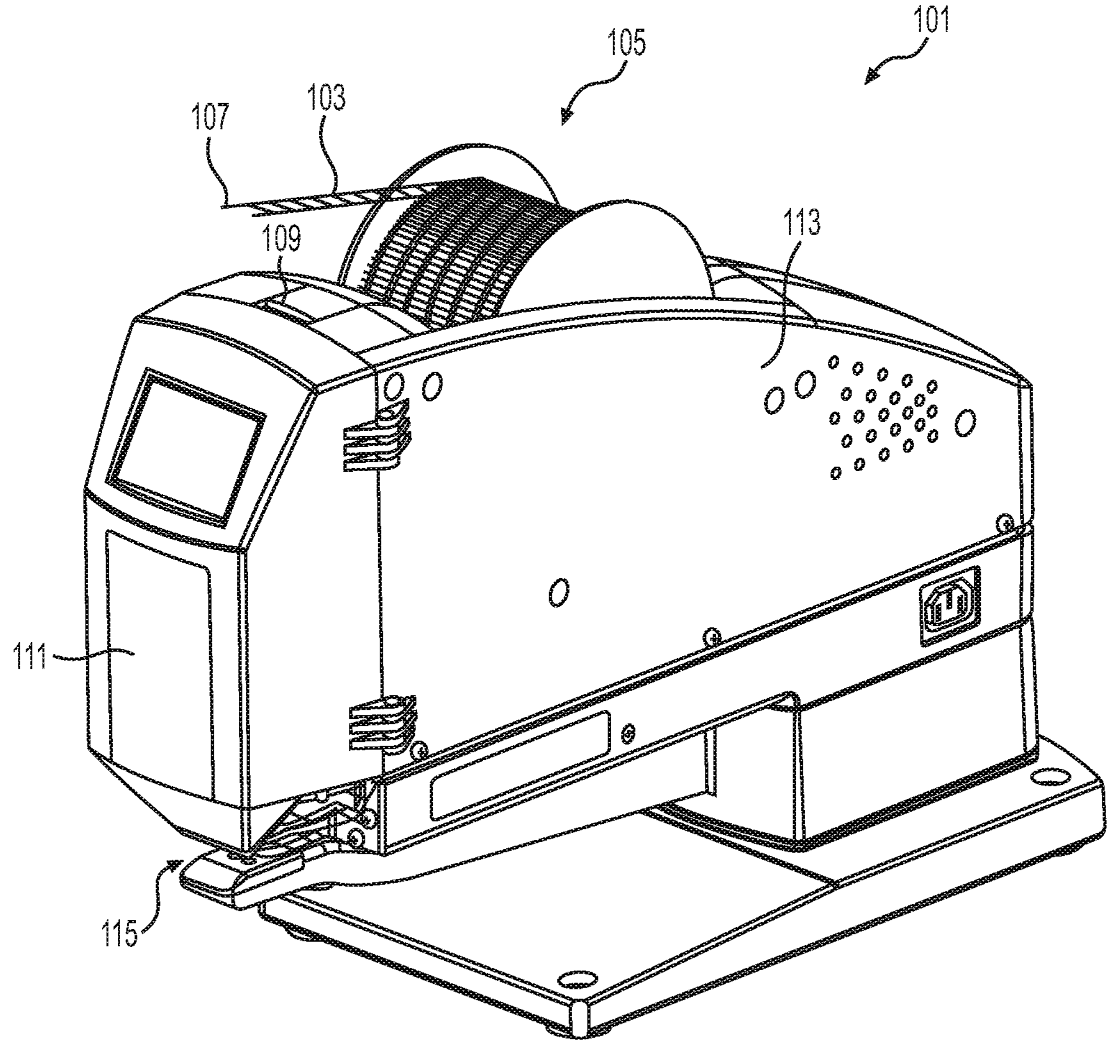
FIG. 1 illustrates a perspective view of a staple apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

FIG. 1 illustrates a staple apparatus 101 incorporating features of the disclosure. A staple chain 103 can be wound on a storage spool 105 that is rotatably mounted to the staple apparatus 101. An end 107 of the staple chain 103 can be fed into a slot 109 of the staple apparatus 101 and interfaced with the apparatus, as discussed below, to fasten articles together with a staple separated from the staple chain. The articles to be attached together can be inserted into a reception area 115 of the staple apparatus 101 and then the staple apparatus 101 may separate a staple from the staple chain 103 to fasten the articles together. For example, with reference to FIG. 28. In some embodiments, a staple 2801 separated from the staple chain 103 can comprise a rung 2805 extending between a first rail segment 2803*a* and a second rail segment 2803*b*. As shown in FIG. 29, in some embodiments, a first article 2901 may be fastened to a second article 2903 by the staple 2801 wherein the rung 2805 extends through openings in the articles 2901, 2903 while the rail segments 2803*a*, 2803*b* anchor the ends of the rung 2805 to prevent inadvertent unfastening of the articles 2901, 2903 from one another.

As shown in FIG. 1, the staple apparatus 101 can include a closure 111 pivotally mounted to a housing 113. An interior area defined by the closure 111 and the housing 113 can contain an assembly 201 of the staple apparatus 101 illustrated in FIG. 2. In some embodiments, features of a front 203 of the assembly 201 can be exposed by pivoting the closure 111 from the closed position (shown in FIG. 1) to an open position (not shown). For purposes of this application, the staple apparatus 101 can be considered the entire apparatus shown in FIG. 1 or any component or combination of components of the assembly 201 illustrated in FIGS. 2-19 and 22-23. In some embodiments, the staple chain is considered part of the staple apparatus. In further embodiments, the staple chain is not considered part of the staple apparatus.

Figure 2:
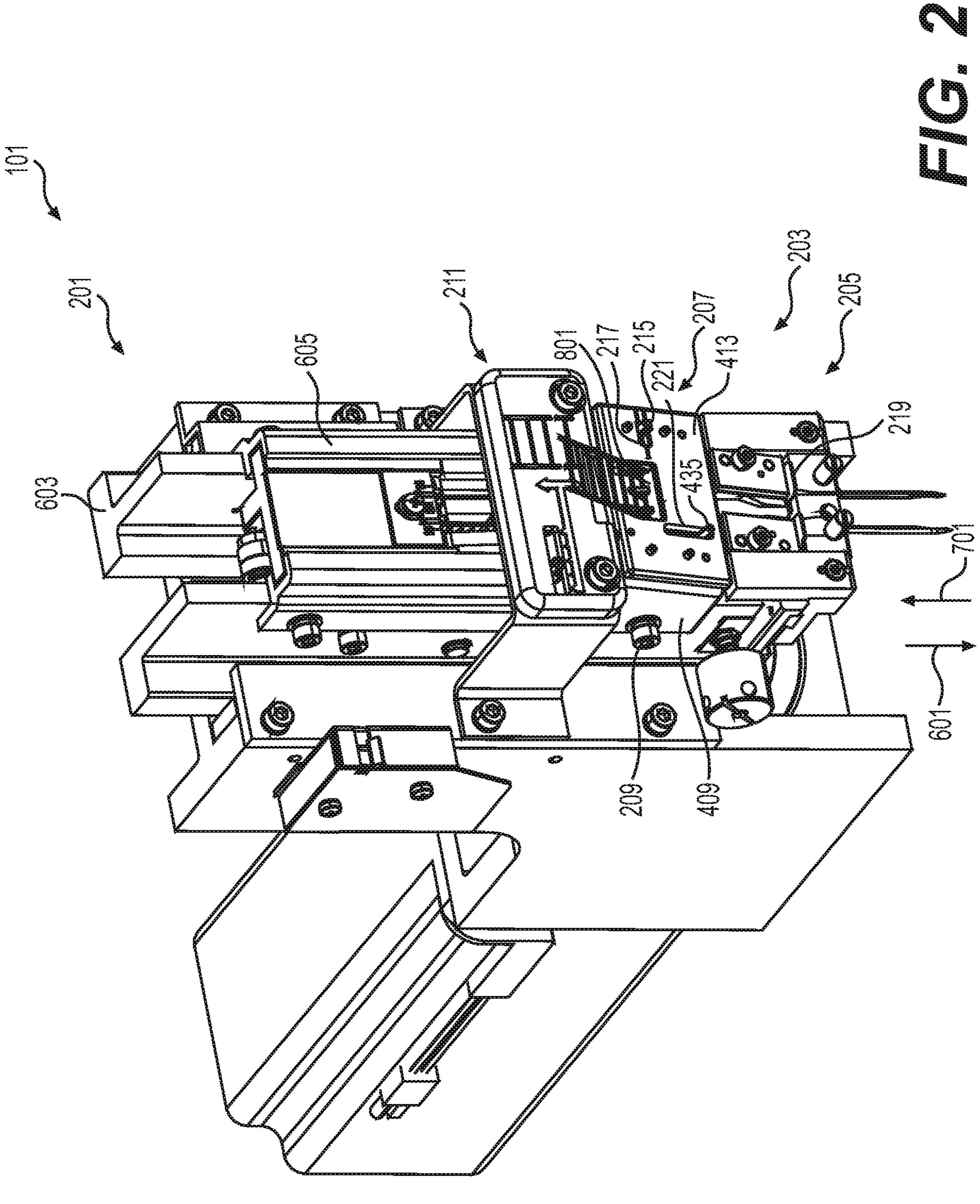
FIG. 2 illustrates a perspective view of an assembly of the staple apparatus in accordance with embodiments of the disclosure.
Figure 3:
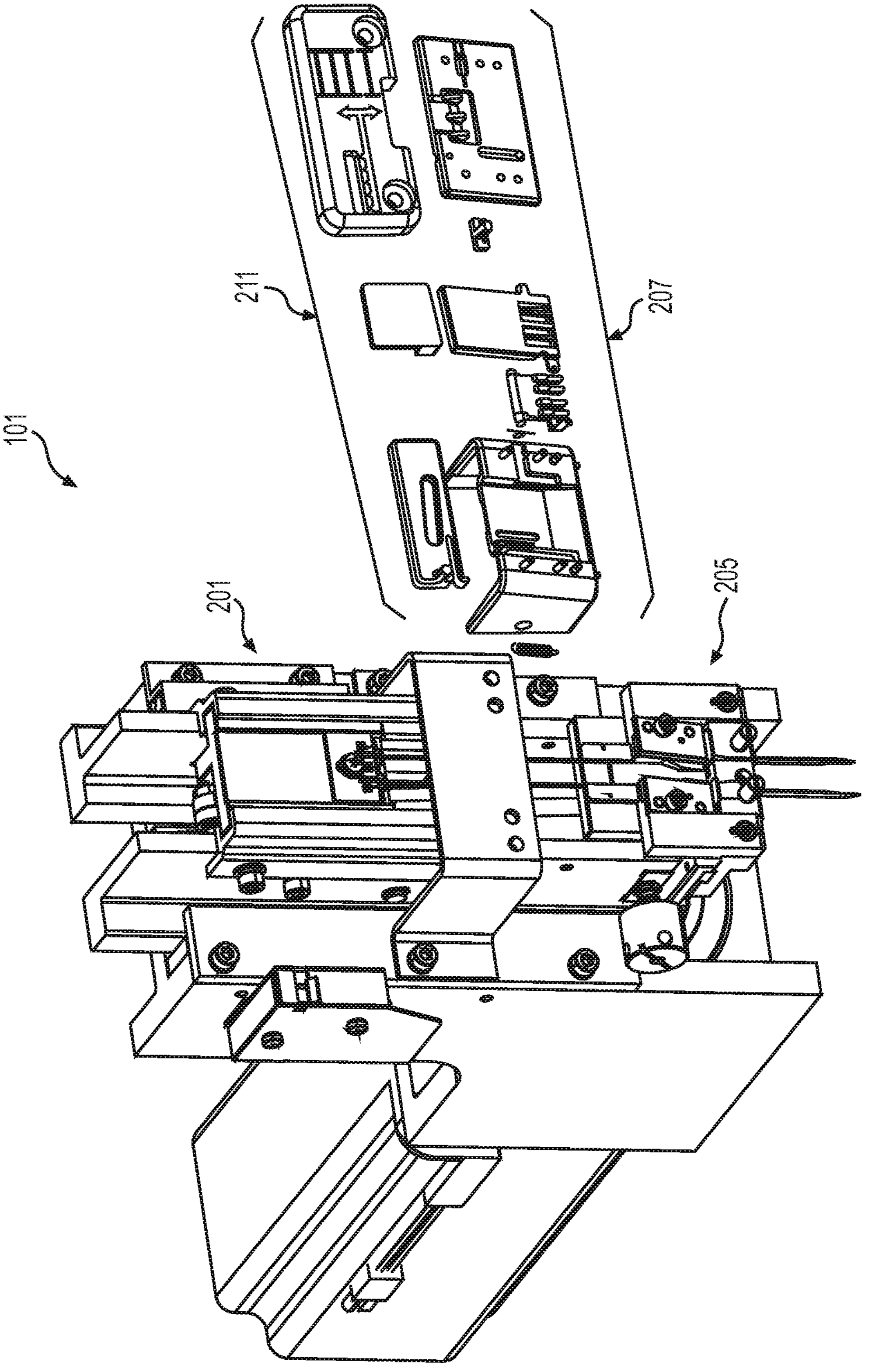
FIG. 3 illustrates a partially exploded perspective view of the assembly of FIG. 2.
Figure 6:
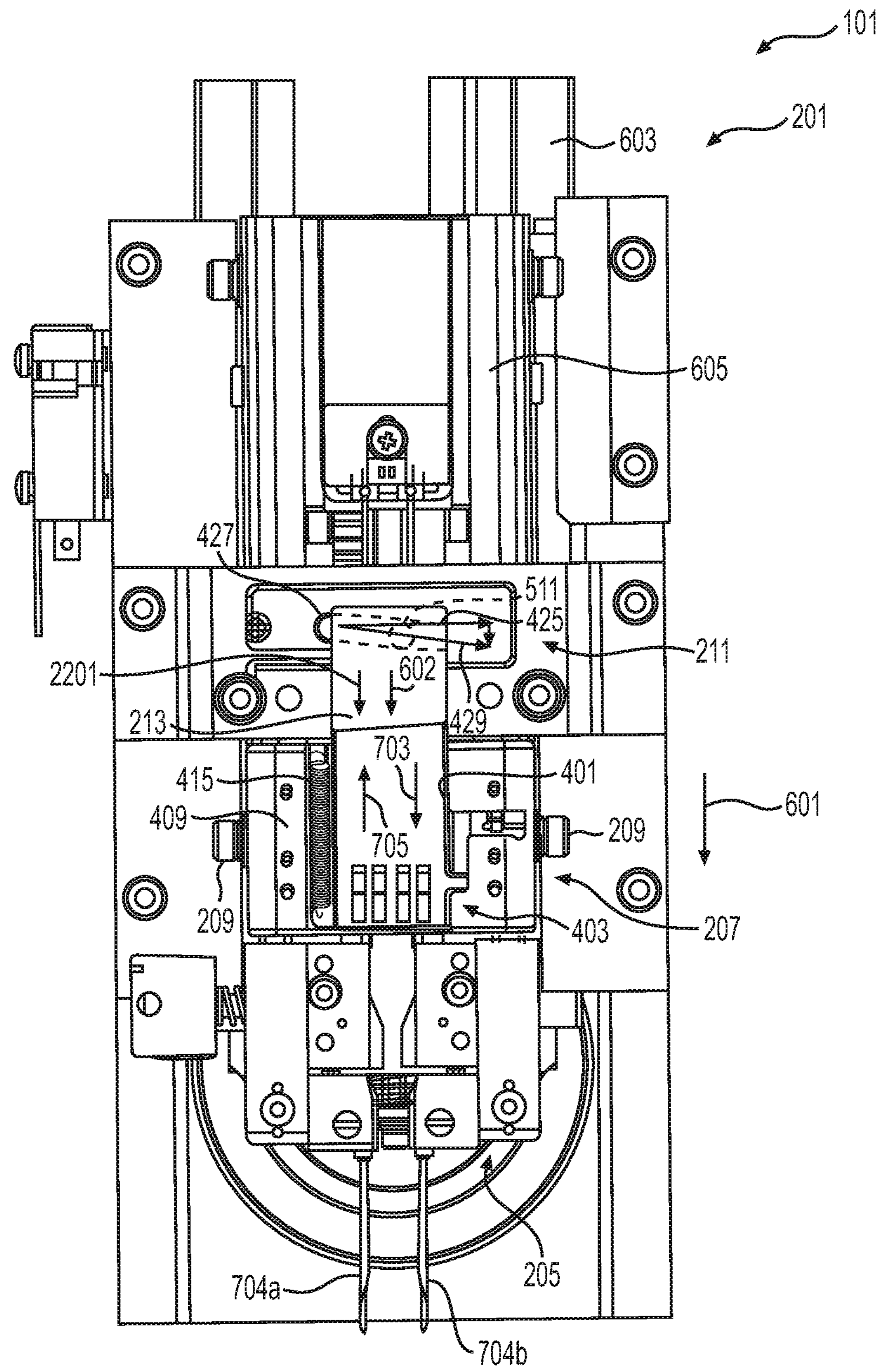
FIG. 6 illustrates a front view of portions of the assembly of FIG. 2 with a staple head of the assembly in a head retracted position and cover members of an indexing apparatus and a staple chain positioning apparatus removed.
Figure 7:
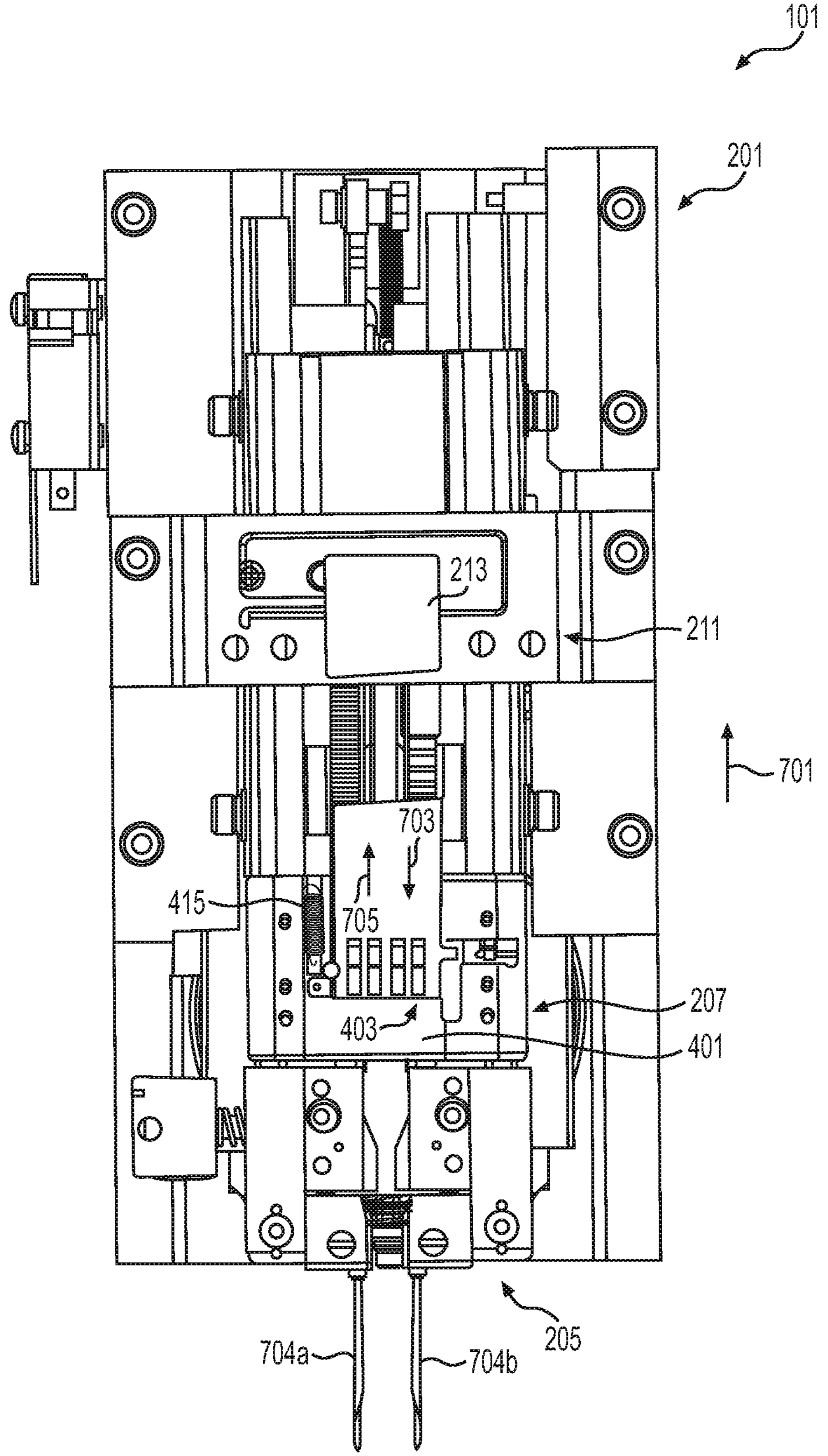
FIG. 7 illustrates a front view of the portions of the assembly of FIG. 6 but with the staple head of the assembly in a head extended position.

FIGS. 2-3 and 6-7 illustrate a staple head 205 that may optionally be considered as part of the staple apparatus. For example, in some embodiments, the staple apparatus 101 is considered as including the staple head 205 although the staple head 205 may not be considered as part of the staple apparatus 101 in further embodiments. As shown in FIGS. 2-3 and 6, the staple head 205 may be positioned in a head retracted position. Referring to FIGS. 6-7, the staple head 205 may be moved in the first staple direction 601 from the head retracted position shown in FIG. 6 to the head extended position shown in FIG. 7. The staple head 205 can also be moved in a second staple direction 701, opposite the first staple direction 601, from the head extended position shown in FIG. 7 to the head retracted position shown in FIG. 6. In the head extended position shown in FIG. 7, the needles 704*a*, 704*b* of the staple head 205 may pierce the articles 2901, 2903 (see FIG. 29) for placement of the staple 2801 while the stapled articles may be removed from the vicinity of the staple apparatus 101 after the staple head is moved to the head retracted position shown in FIG. 6. For purposes of this application, unless otherwise noted, the staple head 205 is considered all portions of the assembly 201 that move together as a single unit from the head retracted position (shown in FIG. 6) to the head extended position (shown in FIG. 7) including, for example, guide rails 603, 605, needles 704*a*, 704*b* and other components that move together as a single unit between the head retracted position and the head extended position. The staple head 205 does not include the support member 409, if provided, of the indexing apparatus 207 discussed below.

In some embodiments, as shown in FIG. 2, the staple apparatus 101 can comprise an indexing apparatus 207. In some embodiments, the indexing apparatus 207 can comprise one or more of the lower row of bracketed exploded components shown in FIGS. 3-5. The indexing apparatus 207 can comprise an indexing member that may comprise a one-piece member in some embodiments. In further embodiments, as shown in FIG. 4, the indexing member 403 can optionally comprise one or a combination of the components bracketed in FIG. 4.

In some embodiments, the indexing member 403 may be at least partially positioned within an indexing area 401. As shown in FIG. 4, the indexing area 401 may comprise a recess within a support member 409 of the indexing apparatus 207. The support member 409 may be fixed for movement with the staple head 205. For instance, apertures 411 of the support member 409 may receive fasteners, such as the bolts 209 illustrated in FIG. 2, to fixedly fasten the support member 409 to the staple head 205. As the support member 409 can be fixedly attached to the staple head 205, the staple head 205 and support member 409 may move together as a single unit in the first staple direction 601 and the second staple direction 701 of the staple head 205. Although not shown, in some embodiments, the indexing area may be defined at least partially or entirely by the staple head 205. As such, the indexing area 401 may travel together with the staple head 205 (e.g., as part of the staple head 205 and/or as part of the indexing apparatus 207).

Figure 4:
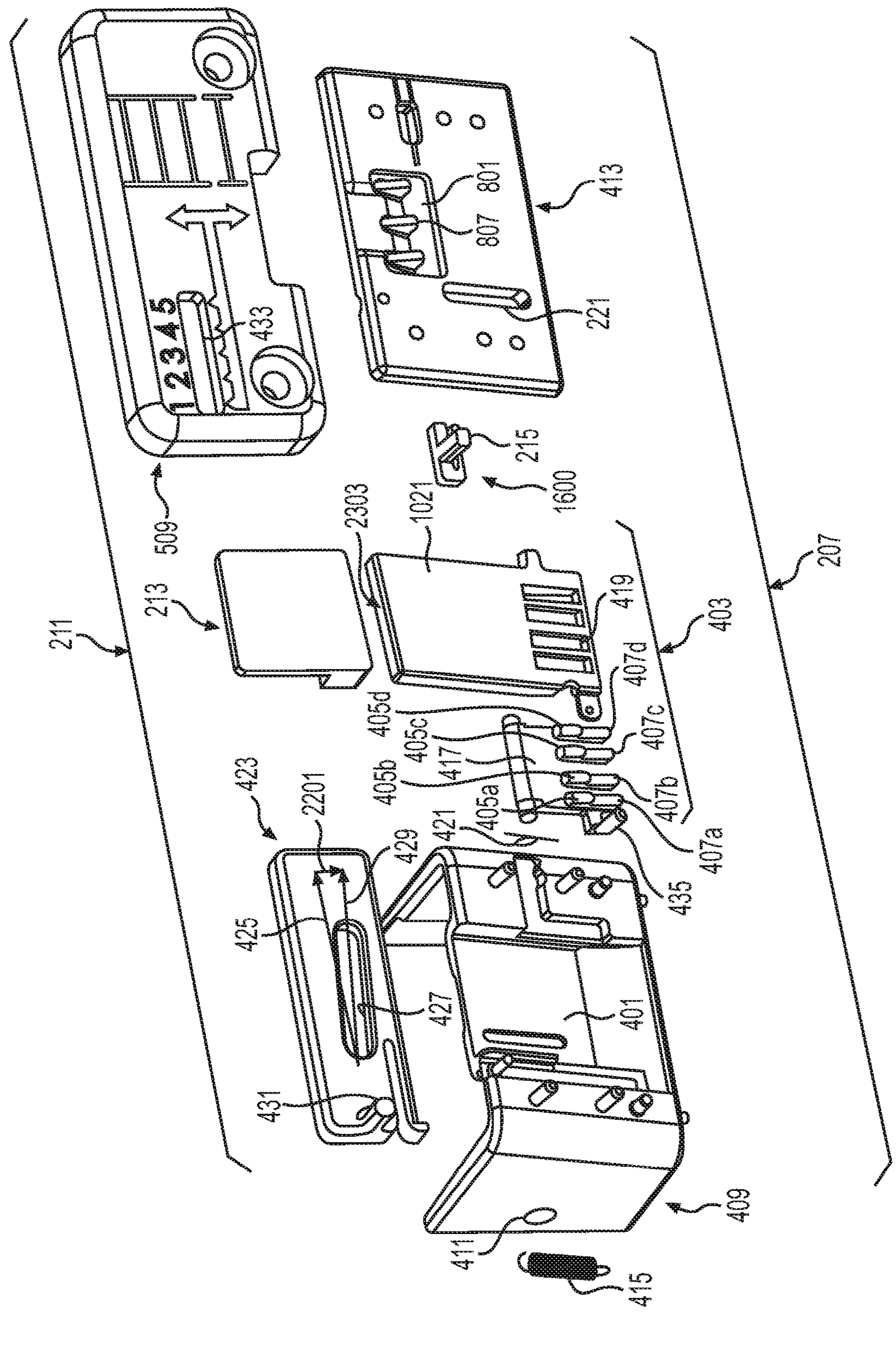
FIG. 4 illustrates an enlarged front perspective exploded view of the components of the assembly shown in FIG. 3.

As shown in FIG. 4, in some embodiments the indexing apparatus 207 may include a cover member 413. As shown in FIG. 2, the cover member 413 may be fastened to the support member 409, wherein the cover member 413 can at least partially define the indexing area 401. For example, as shown in FIG. 10, the indexing area 401 may be defined between the support member 409 and the cover member 413.

In some embodiments, the indexing member 403 can be movable in a first indexing direction 703 from the member extended position (see FIG. 7) to a member retracted position (see FIG. 6) relative to the indexing area 401. The indexing member 403 can also be movable in a second indexing direction 705 from the member retracted position (see FIG. 6) to the member extended position (see FIG. 7). As shown in FIG. 10, the first indexing direction 703 can comprise a directional component comprising the first staple direction 601 of the staple head 205. For example, the travel path 1001 of the indexing member 403 in the first indexing direction 703 can extend at an angle relative to the travel path 1003 of the staple head 205 in the first staple direction 601. Although not shown, in some embodiments, the resultant of the first indexing direction 703 may be substantially identical to the resultant of the first staple direction 601. For example, in some embodiments not shown, the travel path 1001 of the indexing member 403 in the first indexing direction 703 can be parallel to the travel path 1003 of the staple head 205 in the first staple direction 601.

In some embodiments, the indexing member 403 may be biased with an index biasing member 415 toward the member extended position (see FIG. 7) relative to the indexing area 401. A force 602 may be applied to the indexing member 403 to cause the indexing member 403 to travel in the first indexing direction 703, against the force applied by the index biasing member 415, to the member retracted position shown in FIG. 6. However, once the force 602 is removed, the index biasing member 415 can bias the indexing member 403 to travel within the indexing area 401 back along the second indexing direction 705 from the member retracted position (see FIG. 6) to the member extended position (see FIG. 7). In some embodiments, as shown, the index biasing member 415 can comprise the illustrated extension spring. In further embodiments, the index biasing member 415 can comprise another type of spring such as a leaf spring, compression spring, or a length of resilient material.

Figure 10:
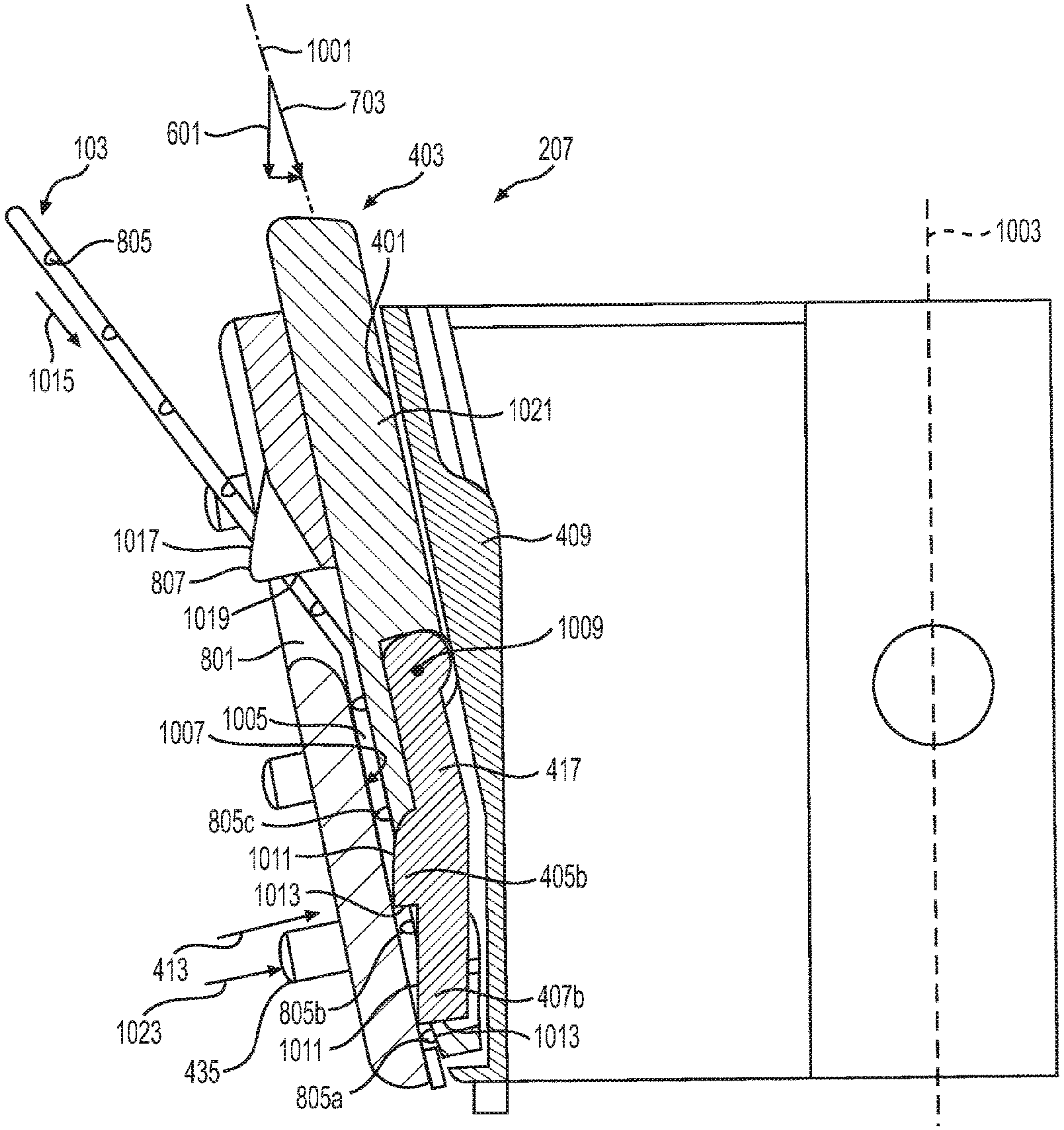
FIG. 10 illustrates a cross-sectional view of the indexing apparatus along line 10-10 of FIG. 8 with a pivot member in an engagement position.

As shown in FIG. 10, the indexing member 403 can define a rung travel path 1005. For example, in some embodiments the rung travel path 1005 can be defined between the indexing member 403 and an inner surface 1007 of the cover member 413. In some embodiments, the indexing member 403 can further comprise an indexing tab. In some embodiments, a single indexing tab may be provided although a plurality of indexing tabs may be provided in further embodiments. For example, as shown in FIG. 4, in some embodiments, the plurality of indexing tabs 405*a-d* and 407*a-d* can be provided although the plurality of indexing tabs may comprise a single pair of indexing tabs or three or more indexing tabs in further embodiments.

Figure 16:
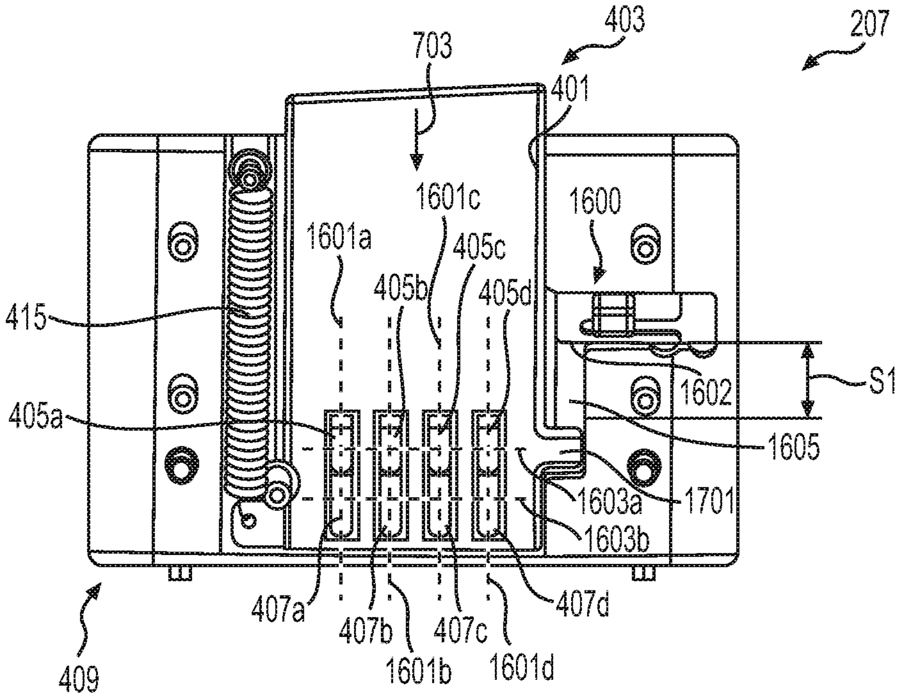
FIG. 16 illustrates embodiments of the indexing apparatus with the cover member of the indexing apparatus removed, the indexing member in a retracted position, and the indexing apparatus arranged with the indexing member having a first stroke length.

Although not required, the plurality of indexing tabs may comprise one or more rows of indexing tabs. In some embodiments, as shown in FIG. 16, the plurality of indexing tabs can comprise the illustrated first row 1603*a* of four indexing tabs 405*a-d* although greater than or less than four indexing tabs may be provided in the first row in further embodiments. In some embodiments, each indexing tab of the plurality of indexing tabs 405*a-d* of the first row 1603*a* of indexing tabs can be identical to the other indexing tabs of the plurality of indexing tabs although different indexing tab configurations may be provided in further embodiments. In some embodiments, as further illustrated, the plurality of indexing tabs can comprise the illustrated second row 1603*b* of four indexing tabs 407*a-d* although greater than or less than four indexing tabs may be provided in the second row in further embodiments. In some embodiments, each indexing tab of the plurality of indexing tabs 407*a-d* of the second row 1603*b* of indexing tabs can be identical to the other indexing tabs of the plurality of indexing tabs although different indexing tab configurations may be provided in further embodiments. In some embodiments, each row 1603*a*, 1603*b* can extend transverse to the first indexing direction 703. In some embodiments, each row 1603*a*, 1603*b* can extend in a direction that is substantially perpendicular to the first indexing direction 703.

In some embodiments, with further reference to FIG. 16, the plurality of indexing tabs can comprise a plurality of two or more indexing tabs arranged in a column of indexing tabs that extend in the first indexing direction. In some embodiments, a first column 1601*a* of indexing tabs can be provided that extends in the first indexing direction 703. The first column 1601*a* of indexing tabs can comprise a corresponding first pair 405*a*, 407*a* of indexing tabs although the first column 1601*a* of indexing tabs may comprise three or more indexing tabs in further embodiments. In some embodiments, the plurality of indexing tabs may comprise a second column 1601*b* of indexing tabs that extends in the first indexing direction 703. The second column 1601*b* of indexing tabs can comprise another corresponding first pair 405*b*, 407*b* of indexing tabs although the second column 1601*b* of indexing tabs may comprise three or more indexing tabs in further embodiments. In some embodiments, the plurality of indexing tabs may comprise a third column 1601*c* of indexing tabs that extends in the first indexing direction 703. The third column 1601*c* of indexing tabs can comprise another corresponding first pair 405*c*, 407*c* of indexing tabs although the third column 1601*c* of indexing tabs may comprise three or more indexing tabs in further embodiments. In some embodiments, the plurality of indexing tabs may comprise a fourth column 1601*d* of indexing tabs that extends in the first indexing direction 703. The fourth column 1601*d* of indexing tabs can comprise another corresponding first pair 405*d*, 407*d* of indexing tabs although the fourth column 1601*d* of indexing tabs may comprise three or more indexing tabs in further embodiments. Although four columns of indexing tabs are illustrated, more or less columns of indexing tabs may be provided in further embodiments.

Figure 8:
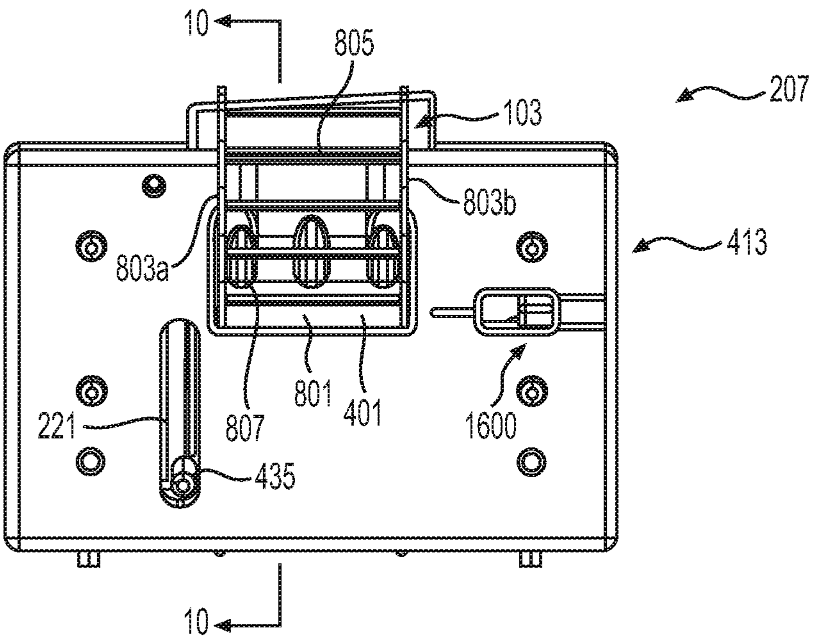
FIG. 8 illustrates a front view of embodiments of the indexing apparatus of the disclosure.
Figure 9:
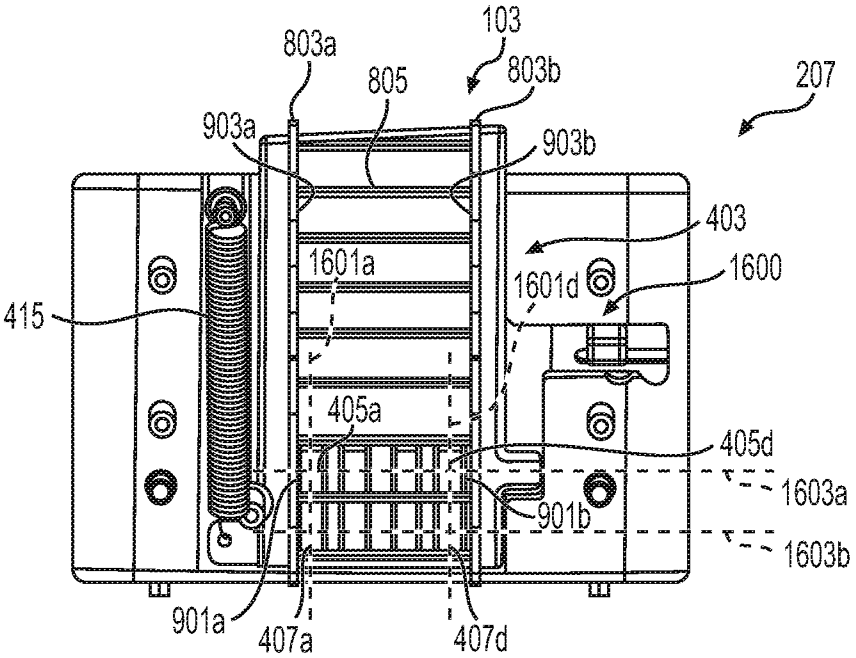
FIG. 9 illustrates a front view of the indexing apparatus of FIG. 8 but with the cover member removed.

FIG. 10 is a cross-sectional view along line 10-10 of FIG. 8, in the first indexing direction 703 and in a plane perpendicular to a rotation axis 1009 discussed below. The cross-sectional view illustrates the cross section of the corresponding first pair 405*b*, 407*b* of the second column 1601*b* of indexing tabs. As shown, each indexing tab can comprise a ramp surface 1011 positioned to taper the rung travel path 1005 in the first indexing direction 703 and a shoulder 1013 positioned past at least a portion of the ramp surface 1011 in the first indexing direction 703. FIG. 8 illustrates the indexing apparatus 207 with the cover member 413 while FIG. 9 illustrates the indexing apparatus 207 without the cover member 413 for clarity. As shown in FIG. 8, the cover member 413 can include a staple chain slot 801 passing through the cover member 413 into the indexing area 401.

The staple chain slot 801 is wide enough to receive the width of the staple chain defined between outer edges of opposed rails 803*a*, 803*b*. The rungs 805 of the staple chain 103 can be equally spaced apart in series along the length of the staple chain 103. Each rung 805 includes a first end attached to a first rail 803*a* of the opposed rails and a second end attached to a second rail 803*b* of the opposed rails. As shown in FIG. 10, the staple chain 103 may be fed along direction 1015 into the staple chain slot 801 and then fed in the first indexing direction 703 through the rung travel path 1005.

When moving the indexing member 403 in the first indexing direction 703 from the extended position shown in FIG. 7 to the retracted position shown in FIG. 6, a rung 805 encountering the ramp surface 1011 of the indexing tab can slide over and past the ramp surface 1011 and then be received within the shoulder 1013. The shoulder 1013 can then act as a stop to inhibit movement of the rung 805 back over the shoulder to the ramp surface 1011. Furthermore, as the shoulder 1013 acts as a stop, moving the staple head 205 in the first staple direction 601 while extending indexing member 403 in the second indexing direction 705 toward the member extended position can feed the staple chain 103 through the staple chain slot 801. As shown in FIGS. 8 and 10, in order to prevent the indexing members from pushing the staple chain 103 back through the staple chain slot 801, the cover member may further comprise a rung tab 807. As shown in FIG. 10, the rung tab 807 can comprise a ramp 1017 to permit passage of a rung 805 of the staple chain 103 over the rung tab 807 when feeding a portion of the staple chain 103 into the staple chain slot 801. The rung tab 807 can further comprise a shoulder 1019 to inhibit passage of the rung 805 of the staple chain 103 back over the rung tab 807 to inhibit a movement the portion of the staple chain 103 out of the staple chain slot 801.

Features of the indexing member 403 can interface with portions of the staple chain 103 to provide stable and reliable feeding of the staple chain 103 with the staple apparatus 101. For example, as shown in FIG. 9, the outer edge(s) 901*a* of one or more outer indexing tabs such as the outer edges 901*a* of the indexing tabs 405*a*, 407*a* of the first column 1601*a* of indexing tabs can abut or extend closely to the inner edge 903*a* of the first rail 803*a* of the staple chain 103. As further shown in FIG. 9, the outer edge(s) 901*b* of one or more outer indexing tabs such as the outer edges 901*b* of the indexing tabs 405*d*, 407*d* of the fourth column 1601*d* of indexing tabs can abut or extend closely to the inner edge 903*b* of the second rail 803*b* of the staple chain 103. Consequently, the staple chain 103 can be reliably trapped by the outer surfaces of the outer indexing tabs to provide proper lateral alignment of the staple chain 103 being fed into the staple apparatus 101. Furthermore, providing a column of two indexing tabs can provide simultaneous gripping of two adjacent rungs 805 to further enhance the stability of the connection between the indexing member 403 and the staple chain 103 to avoid inadvertent disengagement of the staple chain 103 from the indexing member 403 while feeding the staple chain through the rung travel path 1005 with the indexing member 403. Still further, providing multiple columns 1601*a-d* and rows 1603*a-b* of indexing tabs can help prevent tilting of the staple chain 103 within the rung travel path 1005 as well as support the rung 805 that may enhance stability, particularly if the rung is flexible and may deform or flex if not otherwise supported at multiple locations along the width of the rung.

Figure 12:
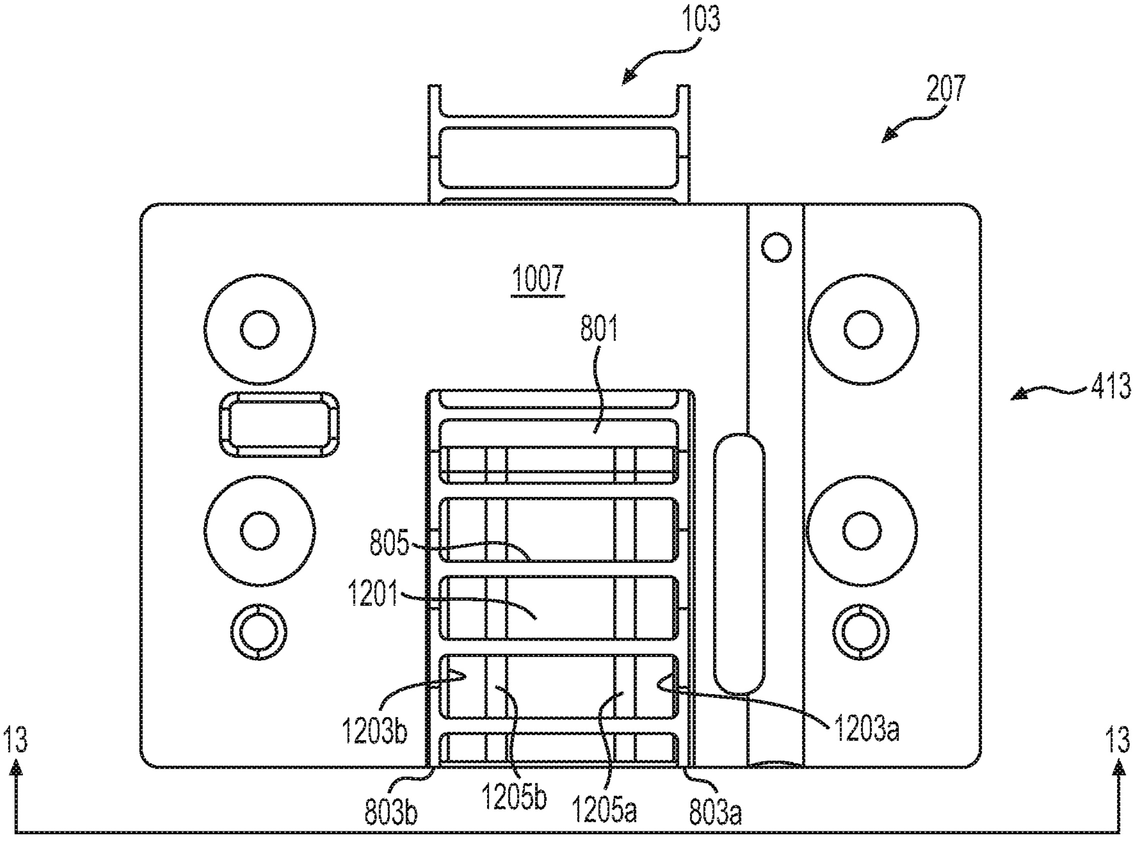
FIG. 12 illustrates a rear view of the cover member of the indexing member in accordance with features of the disclosure.
Figure 13:
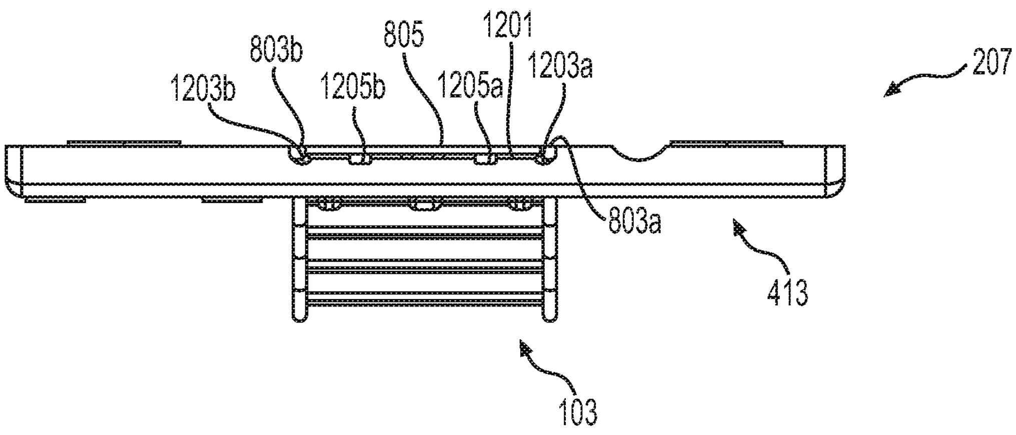
FIG. 13 illustrates a bottom view of the cover member of the indexing member taken along line 13-13 of FIG. 12.

In further examples, features of the cover member 413 can interface with portions of the staple chain 103 to further enhance stable and reliable feeding of the staple chain 103 with the staple apparatus 101. For example, FIG. 12 shows a rear view of the cover member 413 of FIG. 8 with the staple chain 103 with the remaining portions of the indexing member 403 removed for discussion purposes. As shown, a recess 1201 may be defined in the inner surface 1007 of the cover member 413 that can cooperate with the recess of the support member 409 to define the indexing area 401. Furthermore, the inner surface 1007 can comprise a plurality of grooves such as a first pair of grooves 1203*a*, 1203*b*. As can be appreciated by FIG. 10, with the understanding that the grooves 1203*a*, 1203*b* are formed in the inner surface 1007, it will be appreciated that the grooves extend in the first indexing direction 703 and face the indexing area 401. The grooves 1203*a*, 1203*b* correspondingly receive protruding portions of the rails 803*a*, 803*b*. Providing the grooves 1203*a*, 1203*b* that receive the corresponding rails 803*a*, 803*b* can help align the rails and maintain the rails along a predetermined path, thereby reducing errors in feeding the staple chain 103 with the staple apparatus 101.

Figure 14:
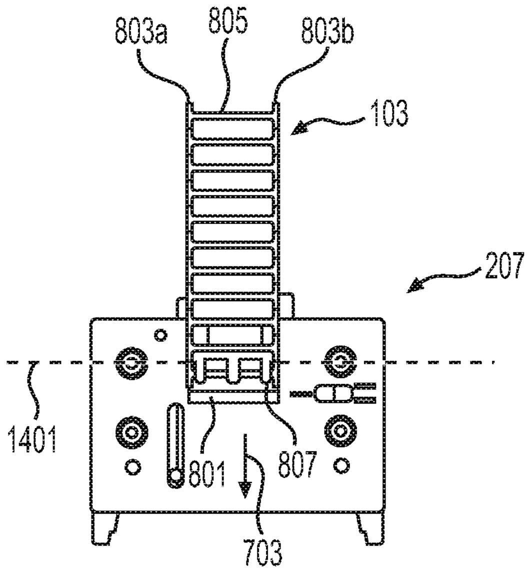
FIG. 14 illustrates a staple chain having a first width being fed into a staple chain slot of the indexing apparatus.
Figure 15:
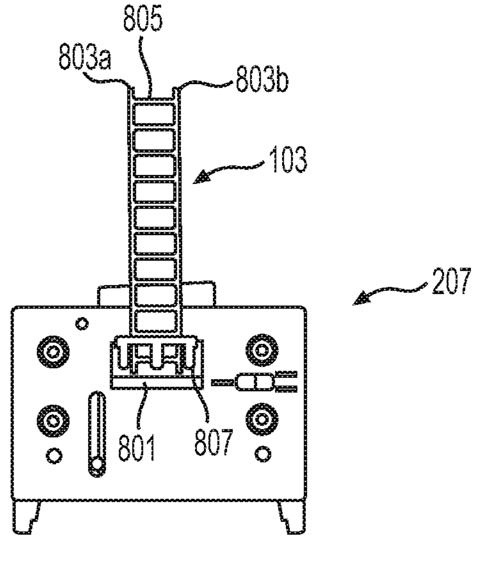
FIG. 15 illustrates another staple chain having a second width being fed into the staple chain slot of the indexing apparatus.

Features of embodiments of the staple apparatus 101 can further provide for reliable and stable feeding of staple chains having different widths. For example, in some embodiments, as shown in FIGS. 8, 14 and 15, the rung tab 807 can comprise a plurality of rung tabs 807 arranged in a row 1401 (see FIG. 14) extending in a direction transverse (e.g., perpendicular) to the first indexing direction 703. In some embodiments, the plurality of rung tabs 807 can comprise three rung tabs. In such embodiments, the rails 803*a*, 803*b* of the wider staple chain 103 may pass through slots defined between the outer opposed sides of the staple chain slot 801 and the outer two rung tabs 807 as shown in FIG. 14. Alternatively, as shown in FIG. 15, the rails 803*a*, 803*b* of the narrower staple chain 103 may pass through slots defined between the outer two rung tabs 807 and the middle rung tab 807 as shown in FIG. 15.

To further provide for staple chains having different widths, as shown in FIG. 12, the plurality of grooves of the inner surface 1007 can further comprise such as a second pair of grooves 1205*a*, 1205*b* that extend in the first indexing direction 703 and face the indexing area 401. The second pair of grooves 1205*a*, 1205*b* can correspondingly receive protruding portions of the rails 803*a*, 803*b* of the narrower rail shown in FIG. 15 to help align and maintain the rails along a predetermined path.

Figure 5:
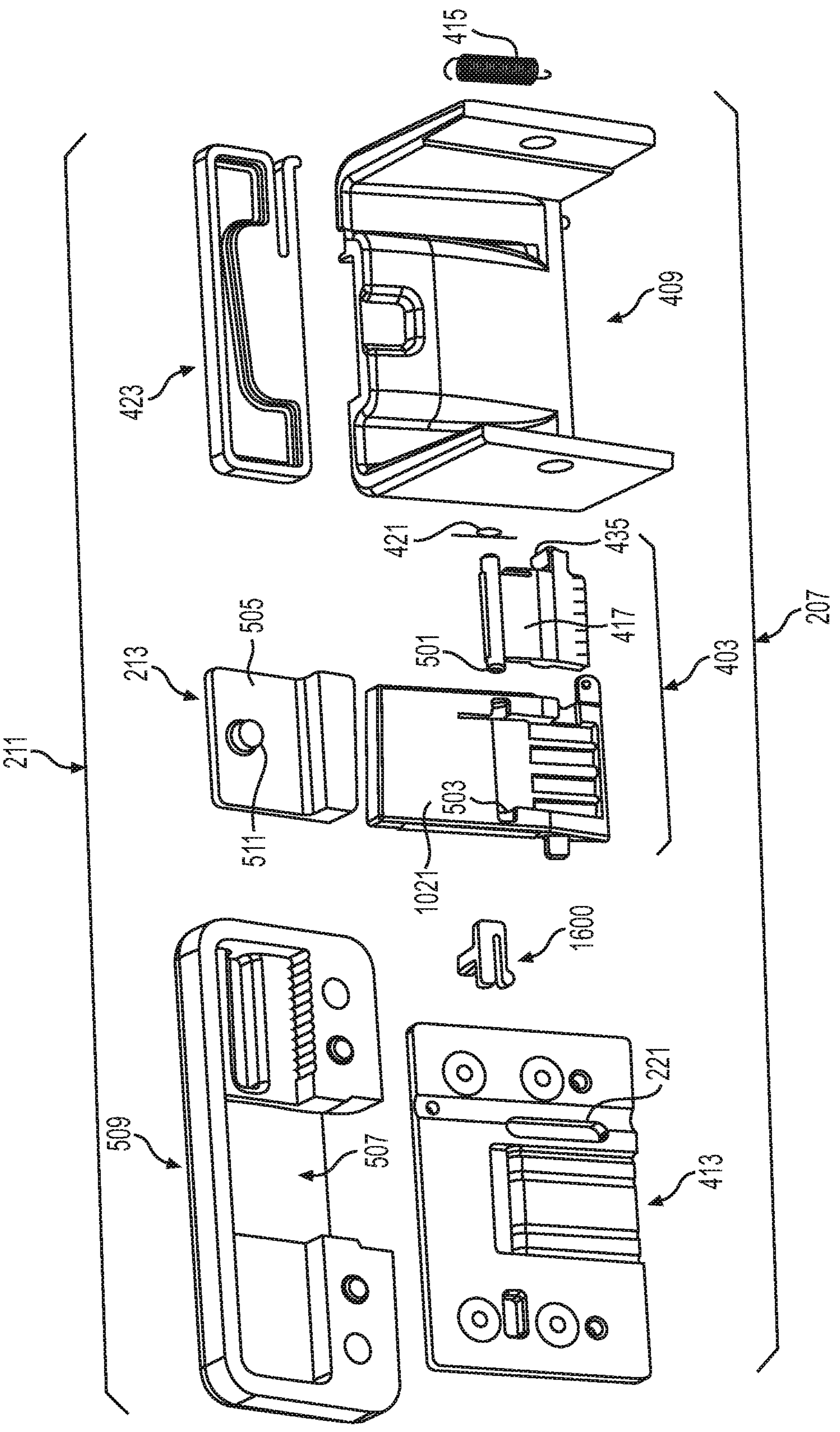
FIG. 5 illustrates an enlarged rear perspective exploded view of the components of the assembly of FIG. 4.
Figure 11:
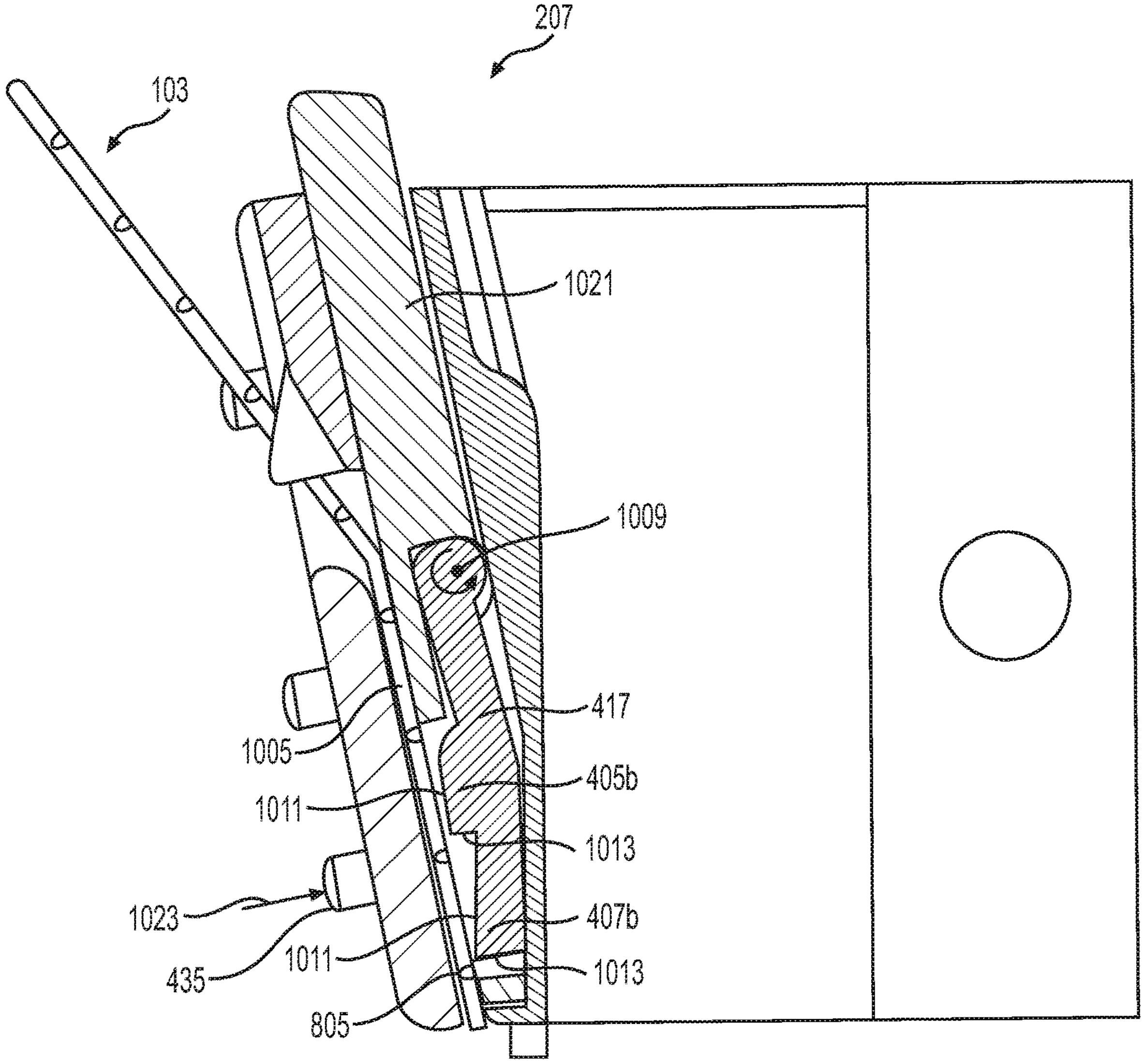
FIG. 11 illustrates the cross-sectional view of the indexing apparatus of FIG. 10 but with the pivot member in a disengagement position.

In some embodiments, the indexing apparatus 207 can be designed to selectively release the staple chain 103 from the staple apparatus 101, for example, to change the width of the staple chain. Once the staple chain 103 is released, the storage spool 105 (see FIG. 1) may be removed and another storage spool with the desired width may be loaded to the staple apparatus 101. Turning to FIGS. 10-11, in some embodiments, the indexing tab(s) 405*b*, 407*b* may be movable relative to a body 1021 from an engagement position (see FIG. 10) where the ramp surface 1011 tapers the rung travel path 1005 to a disengagement position (see FIG. 11) wherein the taper of the rung travel path 1005 is reduced, such as eliminated. Once the taper of the rung travel path 1005 is reduced, as can be appreciated by FIG. 11, the rungs 805 may be passed over the indexing tabs 405*b*, 407*b* as the staple chain 103 is pulled out of the staple chain slot 801. Although not shown, in some embodiments, the body 1021 may be integral with the indexing tab(s) 405*b*, 407*b* wherein the mixing tabs may comprise a flexible portion that can be flexed relative to the body 1021 to move the indexing tab(s) 405*b*, 407*b* relative to the body 1021 to achieve the disengagement position shown in FIG. 11. Alternatively, as shown in FIGS. 4-5 and 10, the indexing tab(s) may comprise a pivot member 417 that is movable relative to the body 1021 such that a portion (e.g., the ramp surface) of the indexing tab extends through an opening 419 (see FIG. 4) in the body 1021. As shown, in some embodiments, the body 1021 may optionally comprise four openings 419, wherein each opening can accommodate one or a column of ramp surfaces of the indexing tabs. With reference to FIG. 5, the pivot member 417 may comprise a pivot pin 501 comprising pivot protrusions that may fit within pivot cavities 503 to allow the pivot member 417 to be rotatably mounted relative to the body 1021 of the indexing member 403 about the rotation axis 1009 (see FIG. 10). The indexing member 403 can further comprise a tab biasing member to bias the indexing tab(s) toward the engagement position shown in FIG. 10. As shown in FIGS. 4-5, in some embodiments, the tab biasing member can comprise a torsion spring 421.

Figure 19:
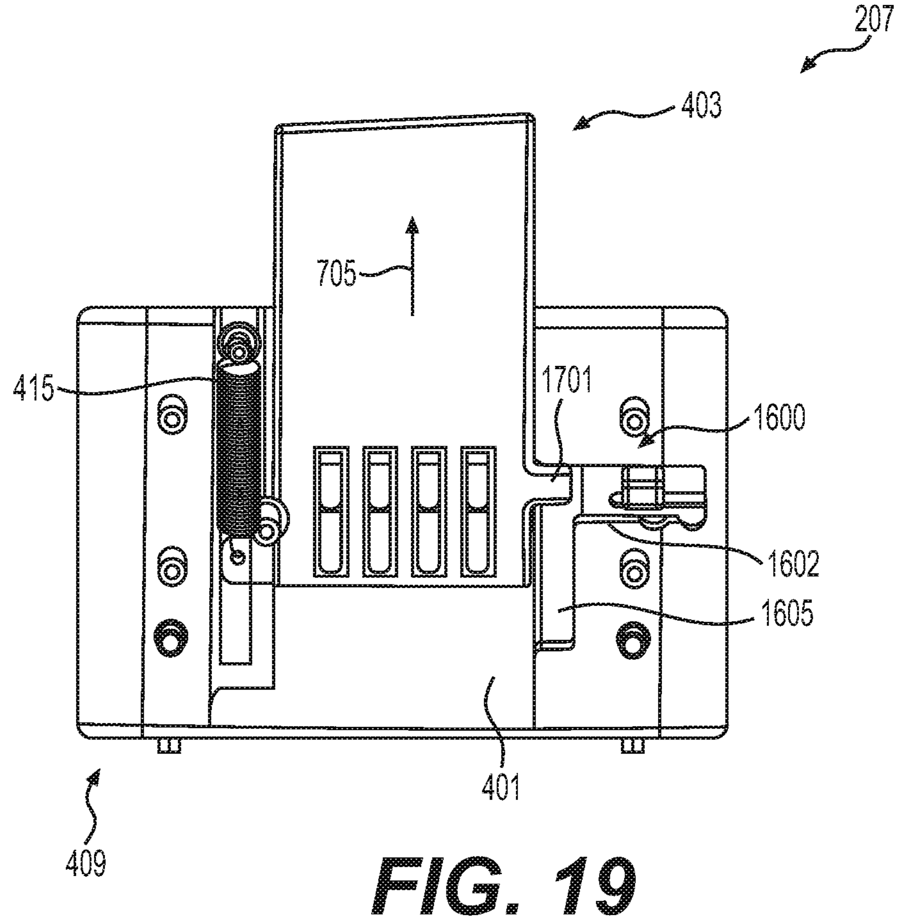
FIG. 19 illustrates embodiments of the indexing apparatus of FIG. 18 but with the indexing member in an extended position.
Figure 20:
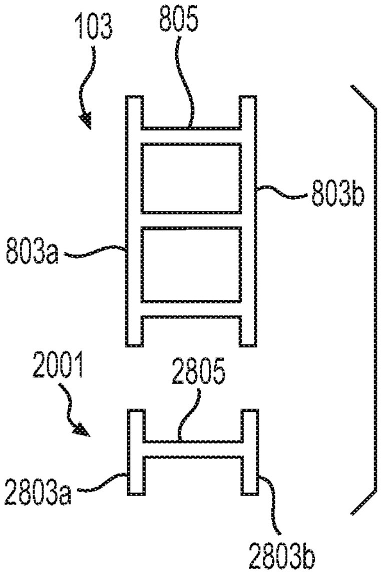
FIG. 20 illustrates a single rung staple separated from a staple chain.
Figure 21:
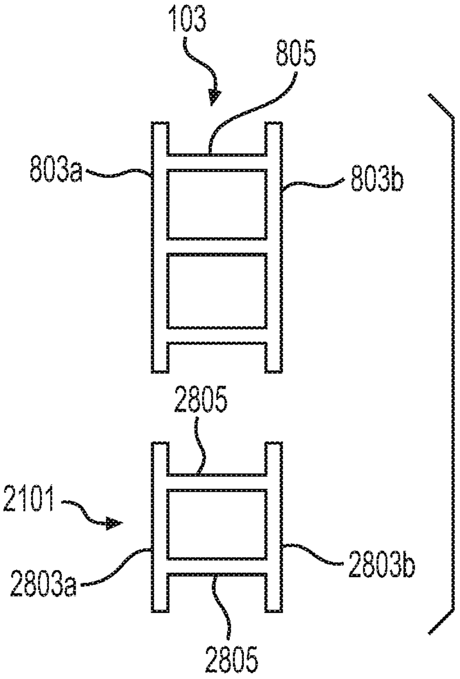
FIG. 21 illustrates a double rung staple separated from the single staple chain.

In some embodiments, the indexing member 403 may comprise features that allow selection between a single rung staple 2001 (see FIG. 20) or a double rung staple 2101 (see FIG. 21). As shown in FIG. 20, the single rung staple 2001 can comprise a single rung 2805 connected between rail segments 2803*a*, 2803*b*. The double rung staple 2101 of FIG. 21 can comprise a pair of rungs 2805 connected between rail segments 2803*a*, 2803*b*. Selection between the single rung staple 2001 and the double rung staple 2101 will be described with initial reference to the indexing apparatus 207 shown in FIGS. 16-19 wherein the indexing member 403 is illustrated without the cover member 413 for description purposes. In some embodiments, the indexing apparatus 207 can comprise a stop device 1600. The stop device 1600 can comprise a shoulder 1602 configured to move relative to the indexing member 403 to engage a portion 1701 (see FIG. 17) of the indexing member 403 to reduce a length of a stroke of the indexing member between the member extended position and the member retracted position. For example, the length of the stroke S1 shown in FIG. 16 is less than the length of the stroke S2 shown in FIG. 18 since the shoulder 1602 is moved relative to the indexing member to engage the portion 1701 of the indexing member 403 to obstruct full movement of the indexing member 403 relative to the support member 409. Alternatively, the length of the stroke S2 shown in FIG. 18 can be increased to be greater than the length of the stroke S1 shown in FIG. 16 by moving the shoulder 1602 relative to the indexing member 403 to prevent engagement with the portion 1701 of the indexing member 403 to allow full movement of the indexing member 403 relative to the support member 409.

Figure 17:
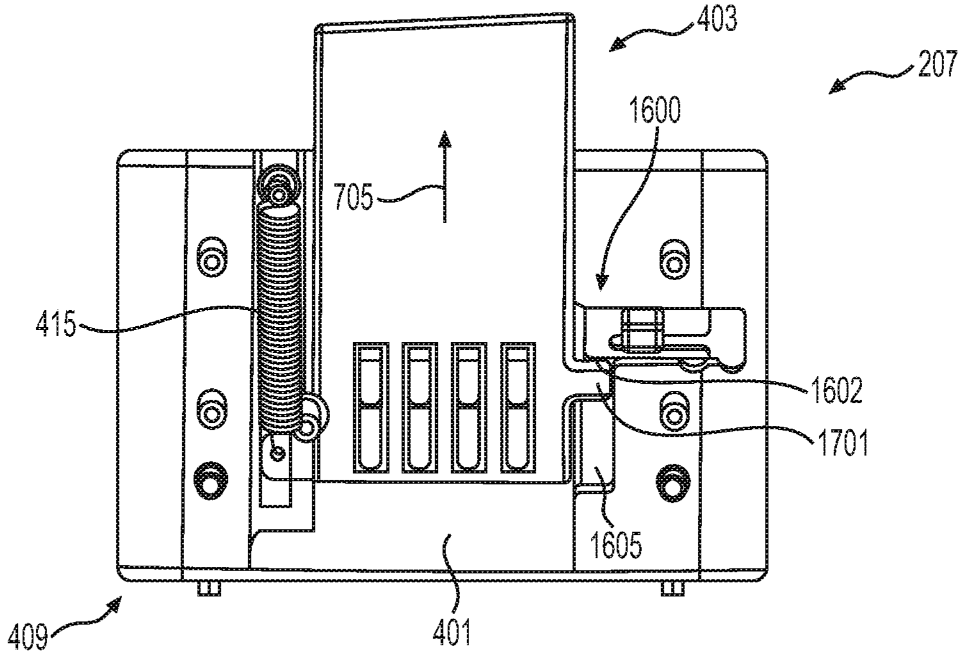
FIG. 17 illustrates embodiments of the indexing apparatus of FIG. 16 but with the indexing member in an extended position.
Figure 18:
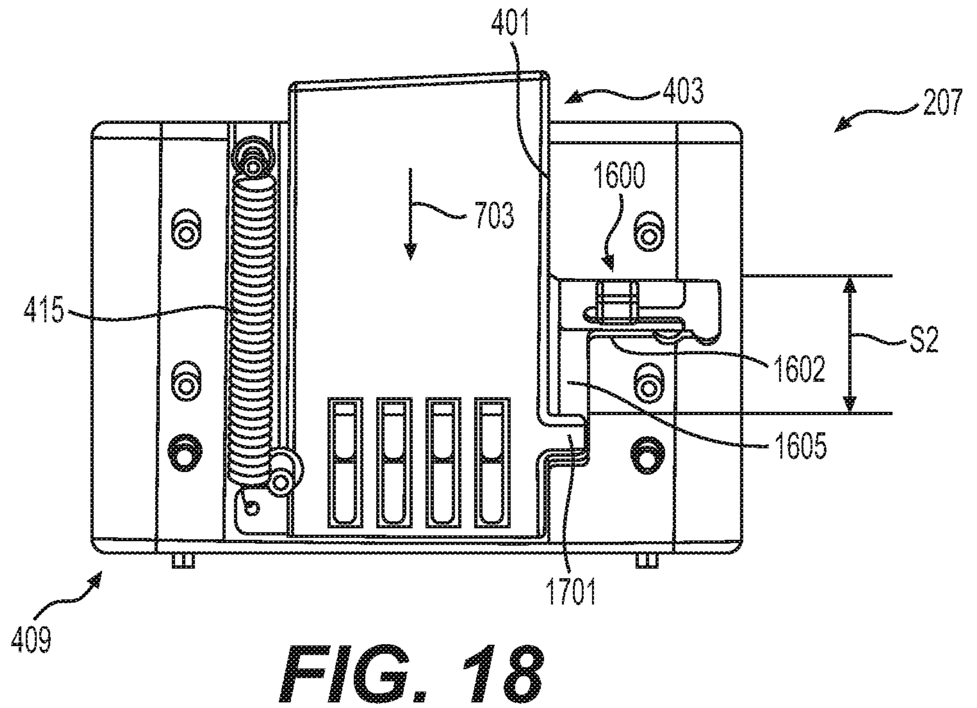
FIG. 18 illustrates embodiments of the indexing apparatus with the cover member of the indexing apparatus removed, the indexing member in an extended position, and the indexing apparatus arranged with the indexing member having a second stroke length that is longer than the first stroke length.

In some embodiments, as shown, the portion 1701 of the indexing member 403 may comprise the illustrated protrusion 1701 extending within a stroke path 1605 defined by the support member 409. In some embodiments, as shown, the stroke path 1605 can comprise a groove formed within the support member 409 that can receive the protrusion 1701 and permit travel of the protrusion within the groove throughout the stroke path 1605 along the stroke length described above. In some embodiments, as shown, the stop device 1600 can comprise a protrusion that comprises the shoulder 1602. The protrusion of the stop device 1600 is considered the portion of the stop device 1600 that extends into the stroke path 1605 in the single rung staple position shown in FIGS. 16-17. As shown in FIGS. 16-17, the protrusion comprising the shoulder 1602 of the stop device 1600 can be moved into the stroke path 1605 to reduce an effective length of stroke path that reduces the length of the stroke S1 of the indexing member 403. Thus, as shown in FIG. 17, the shoulder 1602 of the stop device 1600 can be moved relative to the indexing member 403 to engage the portion (e.g., protrusion 1701) of the indexing member to reduce the extent that the indexing member 403 extends relative to the support member 409 to the member extended position (see FIG. 17). Alternatively, as shown in FIGS. 18-19, the protrusion comprising the shoulder 1602 of the stop device 1600 can be moved out of the stroke path 1605 to increase an effective length of stroke path that increases the length of the stroke S2 of the indexing member 403. Thus, as shown in FIG. 19, the shoulder 1602 of the stop device 1600 can be moved relative to the indexing member 403 to be free from engaging the portion (e.g., protrusion 1701) of the indexing member to increase the extent that the indexing member 403 extends relative to the support member 409 to the member extended position (see FIG. 19).

Figure 24:
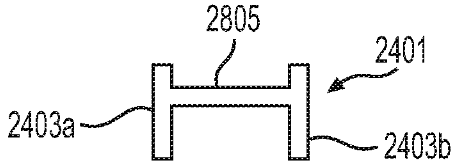
FIG. 24 illustrates a single rung staple with the rung in a first position relative to the pair of rail segments.
Figure 25:
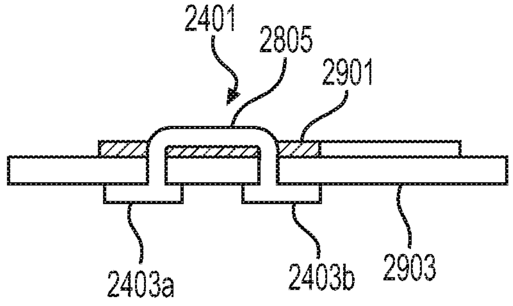
FIG. 25 illustrates the single rung staple of FIG. 24 attaching articles together.
Figure 26:
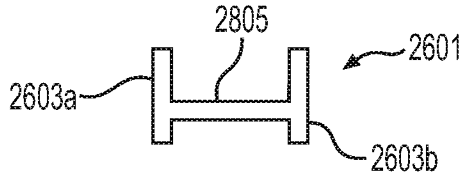
FIG. 26 illustrates a single rung staple with the rung in a second position relative to the pair of rail segments.
Figure 27:
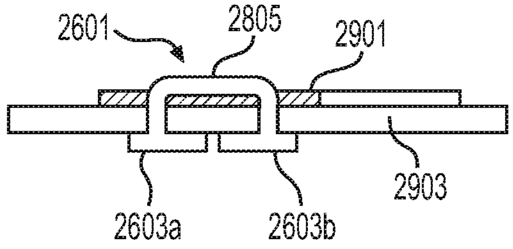
FIG. 27 illustrates the single rung staple of FIG. 26 attaching articles together.
Figure 28:
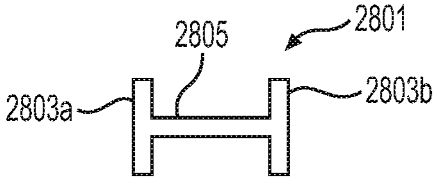
FIG. 28 illustrates a single rung staple with the rung positioned at substantially the midpoint of the pair of rail segments.
Figure 29:
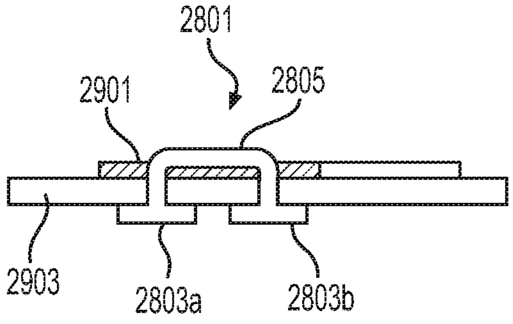
FIG. 29 illustrates the single rung staple of FIG. 28 attaching articles together.

FIGS. 24-29 illustrate various alternative staples 2401, 2601, 2801 of the single rung staple 2001 discussed above. For example, FIGS. 28-29 illustrate the rung 2805 of the staple 2801 positioned at the approximate midpoint of the rail segments 2803*a*, 2803*b*. With embodiments including a single rung 2805 for the staple, positioning the rung 2805 at the approximate midpoint of the rail segments can provide a strong staple 2801 to help inhibit pulling out of the rail segments once fastened as shown in FIG. 29. Alternatively, embodiments including the single rung 2805 (e.g., see staples 2401, 2601) may be positioned along the first rail segment 2403*a*, 2603*a* and the second rail segment 2403*b*, 2603*b* at a location offset from the midpoint of the rail segments. In some embodiments, providing a staple with a rung that is offset from the midpoint of the rail segments (e.g., see staples 2401, 2601) can reduce the force necessary to pull out the rail segments once fastened as shown in FIGS. 25-27. Reducing the force for separation may be desired to reduce the effort necessary to separate the articles.

Figure 22:
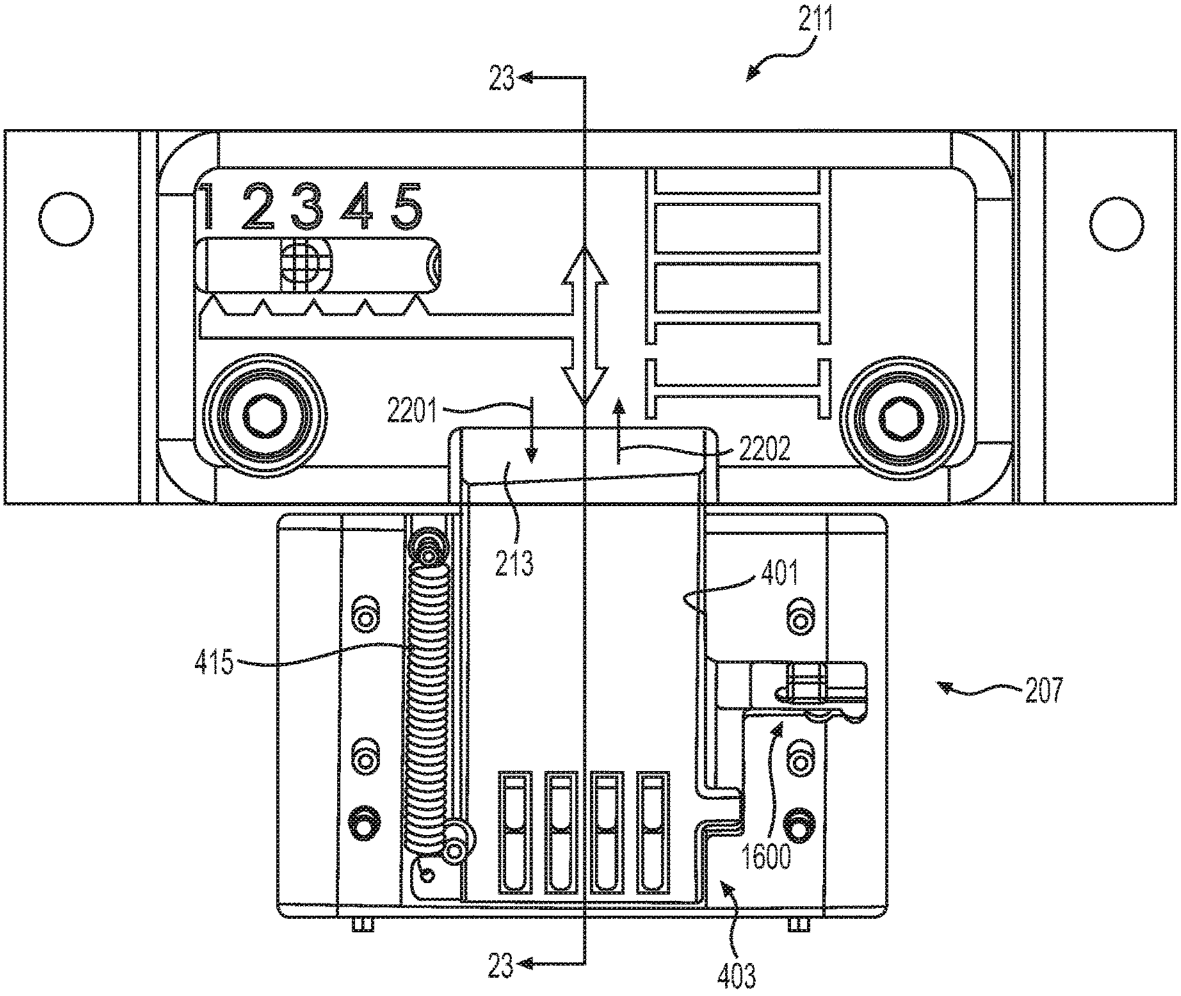
FIG. 22 illustrates a front view of embodiments of the staple chain positioning apparatus and the indexing apparatus of FIG. 2 but with the cover member of the indexing apparatus removed.
Figure 23:
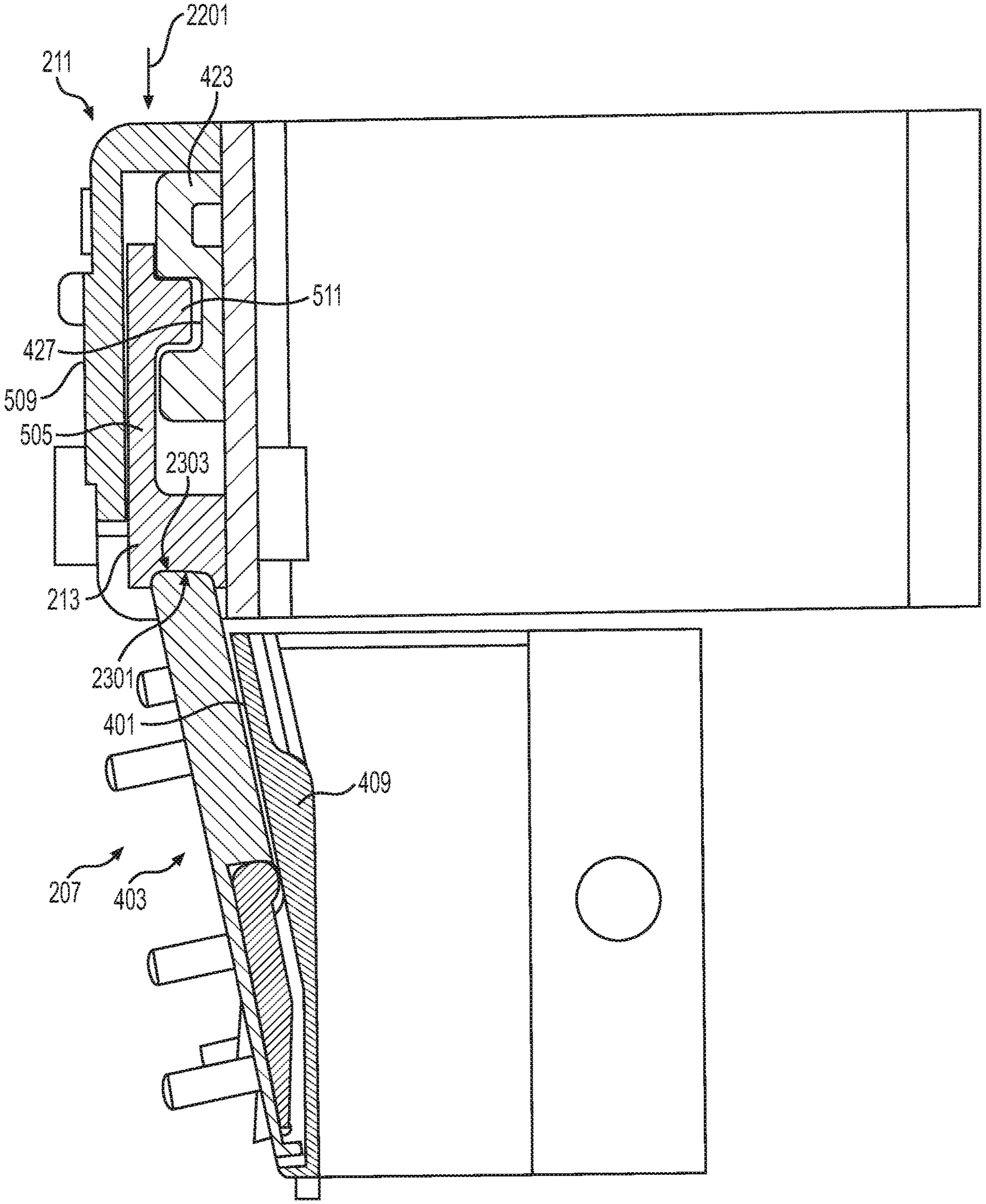
FIG. 23 illustrates a cross-section of the staple chain positioning apparatus and the indexing apparatus along line 23-23 of FIG. 22.

In order to selectively position the rung 2805 along the rail segments to produce the desired staple configuration (e.g., 2401, 2601, 2801), as shown in FIGS. 2-5, the staple apparatus 101 may comprise a staple chain positioning apparatus 211. Exploded front and rear perspective views of embodiments of the staple chain positioning apparatus 211 are respectively shown in the bracketed top row of components in FIGS. 4-5. As shown in FIGS. 4-5, the staple chain positioning apparatus 211 can comprise a push member 213. As shown in FIG. 5, in some embodiments, the push member 213 can include a tongue 505 that can be slidably received within a channel 507 of a cover member 509. The channel 507 can provide a linear guide path from the tongue 505 to facilitate a linear movement of the push member 213 along extension direction 2201 or retraction direction 2202 (See FIG. 22). As shown in FIG. 23, the extension direction 2201 can comprise a directional component of the first indexing direction 703 of the indexing member 403. FIGS. 22-23 illustrate the indexing apparatus 207 without the cover member 413 of the indexing apparatus for discussion purposes.

As further illustrated in FIG. 23, the push member 213 can further include an abutment surface 2301 that can abut an abutment surface 2303 of the indexing member 403 to adjust the extent that the indexing member 403 retracts relative to the indexing area 401 when the staple head 205 is in the head retracted position shown in FIG. 6. As shown in FIG. 4, the staple chain positioning apparatus 211 can further comprise a slide member 423 configured to slide in a slide direction 425 transverse (e.g., substantially perpendicular) to the extension direction 2201 of the push member 213. In some embodiments, an interface between the slide member 423 and the push member 213 can cause movement of the push member in the extension direction 2201 in response to movement of the slide member in the slide direction 425. In some embodiments, the interface can comprise a protrusion positioned within an interface slot. For example, in some embodiments, although not shown, the slide member 423 may comprise a protrusion positioned within an interface slot of the push member 213. Alternatively, the slide member 423 can comprise an interface slot 427 and the push member 213 can comprise a protrusion 511 (see FIG. 5). As shown in FIG. 23, in some embodiments, the protrusion 511 of the push member 213 can be positioned within the interface slot 427 of the slide member 423. As shown in FIG. 4, the interface slot 427 can extend along a slot path direction 429. As shown in FIGS. 4 and 6, the slot path direction 429 can comprise a first directional component comprising the slide direction 425 and a second directional component comprising the extension direction 2201 of the push member 213. Consequently, due to the interface of interface slot 427 of the slide member 423 and the protrusion 511 of the push member 213, movement of the slide member 423 in the slide direction 425 will cause movement of the protrusion 511 as well as the abutment surface 2301 in the retraction direction 2202. Furthermore, due to the interface of interface slot 427 of the slide member 423 and the protrusion 511 of the push member 213, movement of the slide member 423 in a direction opposite the slide direction 425 will cause movement of the protrusion 511 as well as the abutment surface 2301 in the extension direction 2201.

In some embodiments, the cover member 509 of the staple chain positioning apparatus 211 can comprise a cover slot 433 extending in the slide direction 425. A positioning protrusion 431 of the slide member 423 can be positioned to extend through the cover slot 433 to allow a user to contact the positioning protrusion 431 to move the slide member 423 and consequently the push member 213 in response to the movement of the slide member 423.

Methods of feeding the staple chain 103 with the staple apparatus 101 will now be described with initial reference to FIG. 6. The method can comprise moving the staple head 205 in the first staple direction 601 from the head retracted position while the index biasing member 415 biases the indexing member 403 to move relative to the staple head 205 in a second indexing direction 705 opposite the first indexing direction 703 from the member retracted position shown in FIGS. 6, 16 and 18 to the member extended position shown in FIGS. 7, 17 and 19. While the indexing member 403 moves in the second indexing direction 705 from the member retracted position to the member extended position, a portion of the staple chain 103 passes over the ramp 1017 of the rung tab 807 and is then fed into the staple chain slot 801. After the staple head 205 has moved in the first staple direction 601 by the length of the stroke (see S1 in FIG. 16 or S2 in FIG. 17), the indexing member 403 is in the member extended position as shown in FIGS. 7, 17 and 19. The staple head 205 can then continue to move together with the indexing member 403 in the first staple direction 601 while the indexing member 403 is in the member extended position until the staple head achieves the head extended position shown in FIG. 7. While the staple head and the indexing member 403 move together, a first rung 805*a* (see FIG. 10) of the staple chain 103 can be engaged with the shoulder 1013 of the index tab 407*b*. For purposes of description, engagement of the first rung 805*a*, and incrementing to a second rung 805*b* and, in some embodiments, further incrementing to a third rung 805*c*, will be described with reference to the index tab 407*b* with the understanding that identical or similar operation may be carried out with the other index tabs if a plurality of index tabs is provided. In some embodiments, referring to FIG. 10, the shoulder 1013 of the index tab 407*b* engages the first rung 805*a* while the first rung 805*a* and index tab 407*b* are moved together with the staple head 205 in the first staple direction 601 toward the head extended position shown in FIG. 7.

In some embodiments, methods may include adjusting a length of a stroke of the indexing member to change the number of rungs 805 of the staple chain 103 that pass over the ramp surface 1011 of the indexing tab when moving the staple head 205 in the second staple direction 701 opposite the first staple direction from the head extended position (see FIG. 7) to the head retracted position (see FIG. 6). For example, as shown in FIG. 2, to the stop device may include a protrusion 215 that can extend through a slot 217 in the cover member 413. In order to adjust the staple apparatus 101 to provide single rung staples 2001 (see FIG. 20), a user may push the protrusion 215 in a direction toward the staple chain slot 801. Once moved, as shown in FIGS. 16-17, the protrusion of the stop device 1600 comprising the shoulder 1602 is moved into the stroke path 1605 so that the shoulder 1602 interferes with the protrusion 1701 of the indexing member 403 in the extended position (see FIG. 17), thereby reducing the length of the stroke S1 of the indexing member 403 to index by one rung as discussed below. Alternatively, in order to adjust the staple apparatus 101 to provide double rung staples 2101 (see FIG. 21), a user may push the protrusion 215 in a direction away from the staple chain slot 801. Once moved, as shown in FIGS. 18-19, the protrusion of the stop device 1600 comprising the shoulder 1602 is moved out of the stroke path 1605 and therefore does not interfere with the protrusion 1701 of the indexing member 403 in the extended position (see FIG. 19), thereby increasing the length of the stroke S2 of the indexing member 403 to index by two rungs as discussed below.

Once the fastener is applied to the articles (e.g., see FIGS. 25, 27, 29) the fastener head can then begin to move from the head extended position shown in FIG. 7 back toward the head retracted position shown in FIG. 6 in order to increment one or two rungs up the staple chain 103 depending on whether the stop device 1600 is positioned for single or double rung staple production as discussed above. In either position of the stop device 1600, when the staple head 205 begins to move in the second staple direction 701, the staple head 205 and the indexing member 403 (biased in the member extended position shown in FIG. 7 by the index biasing member 415) move together with the staple chain 103. The staple head 205, indexing member 403 (based in the extended position shown in FIG. 7) and the staple chain 103 move together toward the head retracted position until the abutment surface 2303 of the indexing member 403 touches the abutment surface 2301 of the push member 213. Further movement of the staple head 205 in the second staple direction 701 toward the head retracted position then causes the indexing member 403 to begin retracting (against the bias of the biasing member 415) from the member extended position to the member retracted position as the push member 213 applies force 602 (see FIG. 6) to the indexing member 403. As such, once the abutment surface 2303 of the indexing member 403 begins contacting the abutment surface 2301 of the push member 213, further movement of the staple head 205 in the second staple direction 701 results in relative movement between the staple head 205 and the indexing member 403 as the indexing member 403 retracts to the member retracted position shown in FIG. 6. While moving the staple head 205 in the second staple direction 701 and while the indexing member 403 is retracting in the first indexing direction 703, a second rung 805*b* adjacent the first rung 805*a* passes over the ramp surface 1011 of the indexing tab 407*b*. Indeed, the second rung 805*b* passes over the ramp surface 1011 of the indexing tab 407*b* while moving the indexing member 403 in the first indexing direction 703 from the member extended position to the member retracted position. If the stop device 160 is adjusted to the position shown in FIGS. 16-17 to produce the single rung staples discussed above, only a single rung increments over the indexing tab wherein the second rung 805*b* is positioned adjacent or seated within the shoulder 1013 of the indexing tab 407*b* when the staple head 205 reaches the fully retracted position shown in FIG. 6. Alternatively, if the stop device 160 is adjusted to the position shown in FIGS. 18-19 to produce double rung staples discussed above, a third rung 805*c* increments over the indexing tab 407*b*. For example, when the stop device 160 is arranged in the position shown in FIGS. 18-19, the method can comprise further moving the staple head 205 in the second staple direction 701, wherein the third rung 805*c* adjacent the second rung 805*b* passes over the ramp surface 1011 of the indexing tab 407*b*. Indeed, the third rung 805*c* passes over the ramp surface 1011 of the indexing tab 407*b* while continuing to move the indexing member 407*b* in the first indexing direction 703 from the member extended position to the member retracted position. Thus, if the stop device 160 is adjusted to the position shown in FIGS. 18-19 discussed above, two rungs increment over the indexing tab wherein the third rung 805*c* is positioned adjacent or seated within the shoulder 1013 of the indexing tab 407*b* when the staple head 205 reaches the fully retracted position shown in FIG. 6.

The method can further comprising holding the staple chain 103 relative to the staple chain slot 801 while incrementing the second rung 805*b* and, in some embodiments, the third rung 805*c* over the ramp surface 1011 of the indexing tab 407*b* to prevent the portion of the staple chain 103 that passed through the staple chain slot 801 from exiting the staple chain slot 801 in the opposite direction. For instance, in some embodiments, the rung tab(s) 807 may be provided wherein seating of a rung with the shoulder 1019 of the rung tab(s) 807 can inhibit or prevent passing of the portion of the staple chain 103 back through the staple chain slot 801 in the direction opposite the feed direction of the staple chain 103.

In some embodiments, methods can comprise adjusting the member extended position to adjust a cut location of the staple chain. As shown in FIG. 2, a blade 219 can be mounted in a position to cut a desired location of the first rail 803*a* and the second rail 803*b* to provide the staple 2001, 2101. As mentioned previously, there may be a desire to modify the position that the rung(s) 2805 of the single rung staple 2001 or double rung staple 2101 on the rail segments 2803*a*, 2803*b*. By way of example, if a staple 2401 appears with the lower ends of the rails being longer than the top ends of the rails as illustrated in FIG. 24, the staple chain 103 should be moved down relative to the blade 219 for the next cutting procedure to produce a staple more likely to appear as staple 2801 with the rung 2805 moved down relative to the rail segments to approximately the midpoint of the rail segments. To move the staple chain 103 down, the push member 213 may be adjusted down wherein the push member would force the indexing member 403 to move together with the staple chain 103 attached to the indexing member 403 for movement down by the shoulders of the index tabs with the indexing member 403 further retracting into the indexing area 401. As discussed previously, due to the interface of interface slot 427 of the slide member 423 and the protrusion 511 of the push member 213, movement of the slide member 423 in a direction opposite the slide direction 425 will cause movement of the protrusion 511 as well as the abutment surface 2301 in the extension direction 2201 to move the indexing member 403 in the first indexing direction 703 relative to the indexing area 401. For example, a user can move the slide member 423 by engaging the positioning protrusion 431 of the slide member and moving it in the opposite direction.

If a staple 2601 appears with the lower ends of the rails being shorter than the top ends of the rails as illustrated in FIG. 26, the staple chain 103 should be moved up relative to the blade 219 for the next cutting procedure to produce a staple more likely to appear as staple 2801 with the rung 2805 moved up relative to the rail segments to approximately the midpoint of the rail segments. To move the staple chain 103 up, the push member 213 may be adjusted up wherein the push member the next cycling of the staple head would result in the rung engaged by the shoulder of the indexing tab being located higher than it would otherwise. As discussed previously, due to the interface of interface slot 427 of the slide member 423 and the protrusion 511 of the push member 213, movement of the slide member 423 in the slide direction 425 will cause movement of the protrusion 511 as well as the abutment surface 2301 in the retraction direction 2202 to move the indexing member 403 in the second indexing direction 705 relative to the indexing area 401. For example, a user can move the slide member 423 by engaging the positioning protrusion 431 of the slide member and moving it in the slide direction 425.

In some embodiments, methods may further comprise moving the index tab to a disengagement position (see FIG. 11), and then pulling the staple chain 103 out of the staple chain slot 803. As shown in FIGS. 4-5 the pivot member 417 may include an engagement protrusion 435 that can pass through an elongated slot 221 of the cover member 413 of the indexing apparatus 207. As shown in FIG. 10, a user may push the engagement protrusion 435 in direction 1023 to cause the pivot member 417 to rotate about rotation axis 1009 against the bias of the biasing member 421 from the engagement position (FIG. 10) to the disengagement position (FIG. 11). Once in the disengagement position shown in FIG. 11, the staple chain 103 maybe pulled out of the staple chain slot 803 without significant interference of the shoulders of the index tabs that have been pivoted away significantly out of the rung travel path 1005.

The following are example embodiments of the disclosure with the understanding that further example embodiments may be provided in accordance with the disclosure. Furthermore, any of the embodiments discussed below may be used alone or in combination with any of the other embodiments discussed below.

Embodiment 1. A staple apparatus can comprise a staple head movable in a first staple direction from a head retracted position to a head extended position. The staple apparatus can further comprise an indexing apparatus comprising an index biasing member and an indexing member. The indexing member can be positioned at least partially within an indexing area and biased with the index biasing member toward a member extended position relative to the indexing area. The indexing member can be movable in a first indexing direction from the member extended position to a member retracted position relative to the indexing area. The first indexing direction can comprise a directional component comprising the first staple direction. The indexing member can define a rung travel path and can further comprise an indexing tab comprising a ramp surface positioned to taper the rung travel path in the first indexing direction. The indexing tab can further comprise a shoulder positioned past at least a portion of the ramp surface in the first indexing direction.

Embodiment 2. The staple apparatus of embodiment 1, wherein the indexing apparatus can further comprise a cover member at least partially defining the indexing area. The cover member can comprise a staple chain slot passing through the cover member to the indexing area.

Embodiment 3. The staple apparatus of embodiment 2, wherein the cover member can include a plurality of grooves extending in the first indexing direction and facing the indexing area. The plurality of grooves can comprise a first pair of grooves.

Embodiment 4. The staple apparatus of embodiment 3, wherein the plurality of grooves can further comprise a second pair of grooves.

Embodiment 5. The staple apparatus of any one of embodiments 2-4, wherein the cover member can further comprise a rung tab comprising a ramp to permit passage of a rung of a staple chain over the rung tab when feeding a portion of the staple chain into the staple chain slot. The rung tab can further comprise a shoulder to inhibit passage of the rung of the staple chain back over the rung tab to inhibit a movement the portion of the staple chain out of the staple chain slot.

Embodiment 6. The staple apparatus of embodiment 5, wherein the rung tab can comprise a plurality of rung tabs arranged in a row extending in a direction transverse to the first indexing direction.

Embodiment 7. The staple apparatus of embodiment 6, wherein the plurality of rung tabs can comprise three rung tabs.

Embodiment 8. The staple apparatus of any one of embodiments 1-7, wherein a portion of the indexing tab can extend through an opening in a body of the indexing member.

Embodiment 9. The staple apparatus of embodiment 8, wherein the indexing tab can be movable relative to the body from an engagement position where the ramp surface tapers the rung travel path to a disengagement position wherein the taper of the rung travel path is reduced.

Embodiment 10. The staple apparatus of embodiment 9, wherein the indexing member can further comprise a tab biasing member, wherein the indexing tab is biased by the tab biasing member toward the engagement position.

Embodiment 11. The staple apparatus of embodiment 10, wherein the tab biasing member can comprise a torsion spring.

Embodiment 12. The staple apparatus of any one of embodiments 8-11, wherein the indexing tab can be rotatably mounted relative to the body of the indexing member.

Embodiment 13. The staple apparatus of any one of embodiments 1-12, wherein the indexing tab can comprise a plurality of indexing tabs.

Embodiment 14. The staple apparatus of embodiment 13, wherein a first pair of the plurality of indexing tabs can be arranged in a column extending in the first indexing direction.

Embodiment 15. The staple apparatus of any one of embodiments 13-14, wherein a second pair of the plurality of indexing tabs can be arranged in a row extending in a direction transverse to the first indexing direction.

Embodiment 16. The staple apparatus of any one of embodiments 1-15, wherein the indexing apparatus can further comprise a stop device including a shoulder configured to move relative to the indexing member to engage a portion of the indexing member to reduce a length of a stroke of the indexing member between the member extended position and the member retracted position.

Embodiment 17. The staple apparatus of embodiment 16, wherein the portion of the indexing member can comprise a protrusion extending within a stroke path.

Embodiment 18. The staple apparatus of embodiment 17, wherein the stop device can comprise a protrusion configured to be moved into the stroke path to reduce an effective length of stroke path that reduces the length of the stroke of the indexing member.

Embodiment 19. The staple apparatus of any one of embodiments 16-18, wherein the shoulder of the stop device can be configured to move relative to the indexing member to engage the portion of the indexing member to reduce the extent that the indexing member extends to the member extended position.

Embodiment 20. The staple apparatus of any one of embodiments 1-19, further comprising a staple chain positioning apparatus. The staple chain positioning apparatus can comprise a push member comprising an abutment surface configured to abut an abutment surface of the indexing member to adjust the extent that the indexing member retracts relative to the indexing area when the staple head is in the head retracted position.

Embodiment 21. The staple apparatus of embodiment 20, wherein the push member can be movable in an extension direction comprising a directional component comprising the first indexing direction.

Embodiment 22. The staple apparatus of anyone of embodiments 20-21, wherein the staple chain positioning apparatus can further comprise a slide member configured to slide in a slide direction transverse to the extension direction. An interface between the slide member and the push member can cause movement of the push member in the extension direction in response to movement of the slide member in the slide direction. The interface can comprise an interface protrusion positioned within an interface slot.

Embodiment 23. The staple apparatus of embodiment 22, wherein the push member can comprise the interface protrusion and the slide member comprises the interface slot.

Embodiment 24. The staple apparatus of any one of embodiments 22-23, wherein the staple chain positioning apparatus can further comprise a cover member comprising a cover slot extending in the slide direction. The slide member can comprise a positioning protrusion extending through the cover slot of the cover member of the staple chain positioning apparatus.

Embodiment 25. The staple apparatus of any one of embodiments 1-24, wherein the index biasing member can comprise an extension spring.

Embodiment 26. An indexing apparatus for indexing a staple chain can comprise a support member, an index biasing member, and an indexing member positioned at least partially within an indexing area and biased with the index biasing member toward a member extended position relative to the indexing area. The indexing member can be movable in a first indexing direction from the member extended position to a member retracted position relative to the indexing area. The indexing member can define a rung travel path and can further comprise an indexing tab comprising a ramp surface positioned to taper the rung travel path in the first indexing direction. The indexing tab can further comprise a shoulder positioned past at least a portion of the ramp surface in the first indexing direction.

Embodiment 27. The indexing apparatus of embodiment 26, wherein the indexing apparatus can further comprise a cover member comprising a staple chain slot passing through the cover member to the indexing area. The indexing area can be defined between the support member and the cover member.

Embodiment 28. The indexing apparatus of embodiment 27, wherein the cover member can include a plurality of grooves extending in the first indexing direction and facing the indexing area. The plurality of grooves can comprise a first pair of grooves.

Embodiment 29. The indexing apparatus of embodiment 28, wherein the plurality of grooves can further comprise a second pair of grooves.

Embodiment 30. The indexing apparatus of any one of embodiments 27-29, wherein the cover member can further comprise a rung tab comprising a ramp to permit passage of a rung of a staple chain over the rung tab when feeding a portion of the staple chain into the staple chain slot. The rung tab can further comprise a shoulder to inhibit passage of the rung of the staple chain back over the rung tab to inhibit a movement the portion of the staple chain out of the staple chain slot.

Embodiment 31. The indexing apparatus of embodiment 30, wherein the rung tab can comprise a plurality of rung tabs arranged in a row extending in a direction transverse to the first indexing direction.

Embodiment 32. The indexing apparatus of embodiment 31, wherein the plurality of rung tabs can comprise three rung tabs.

Embodiment 33. The indexing apparatus of any one of embodiments 26-32, wherein a portion of the indexing tab can extend through an opening in a body of the indexing member.

Embodiment 34. The indexing apparatus of embodiment 33, wherein the indexing tab can be movable relative to the body from an engagement position where the ramp tapers the rung travel path to a disengagement position wherein the taper of the rung travel path is reduced.

Embodiment 35. The indexing apparatus of embodiment 34, wherein the indexing tab can be biased by a tab biasing member toward the engagement position.

Embodiment 36. The indexing apparatus of embodiment 35, wherein the tab biasing member can comprise a torsion spring.

Embodiment 37. The indexing apparatus of any one of embodiments 33-36, wherein the indexing tab can be rotatably mounted relative to the body of the indexing member.

Embodiment 38. The indexing apparatus of any one of embodiments 26-37, wherein the indexing tab can comprise a plurality of indexing tabs.

Embodiment 39. The indexing apparatus of embodiment 38, wherein a first pair of the plurality of indexing tabs can be arranged in a column extending in the first indexing direction.

Embodiment 40. The indexing apparatus of any one of embodiments 38-39, wherein a second pair of the plurality of indexing tabs can be arranged in a row extending in a direction transverse to the first indexing direction.

Embodiment 41. The indexing apparatus of any one of embodiments 26-40, wherein the indexing apparatus can further comprise a stop device including a shoulder configured to move relative to the indexing member to engage a portion of the indexing member to reduce a length of a stroke of the indexing member between the member extended position and the member retracted position.

Embodiment 42. The indexing apparatus of embodiment 41, wherein the portion of the indexing member can comprise a protrusion extending within a stroke path.

Embodiment 43. The indexing apparatus of embodiment 42, wherein the stop device can comprise a protrusion configured to be moved into the stroke path to reduce an effective length of stroke path that reduces the length of the stroke of the indexing member.

Embodiment 44. The indexing apparatus of any one of embodiments 41-43, wherein the shoulder of the stop device can be configured to move relative to the indexing member to engage the portion of the indexing member to reduce the extent that the indexing member extends to the member extended position.

Embodiment 45. A staple chain positioning apparatus can comprise a push member movable in an extension direction and a slide member configured to slide in a slide direction transverse to the extension direction. An interface between the slide member and the push member can cause movement of the push member in the extension direction in response to movement of the slide member in the slide direction. The interface can comprise an interface protrusion positioned within the interface slot.

Embodiment 46. The staple chain positioning apparatus of embodiment 45, wherein the staple chain positioning apparatus can further comprise a cover member comprising a cover slot extending in the slide direction, and the slide member comprising a positioning protrusion extending through the cover slot of the cover member.

Embodiment 47. A method of feeding a staple chain with the staple apparatus of embodiment 1 can comprise moving the staple head in the first staple direction from the head retracted position while the index biasing member biases the indexing member to move relative to the staple head in a second indexing direction opposite the first indexing direction from the member retracted position to the member extended position. The method can further comprise continuing to move the staple head in the first staple direction such that the indexing member and a first rung of a staple chain engaging the shoulder of the indexing tab are moved together with the staple head in the first staple direction toward the head extended position.

Embodiment 48. The method of embodiment 47, wherein the method can further comprise adjusting a length of a stroke of the indexing member to change the number of rungs of the staple chain that pass over the ramp surface of the indexing tab when moving the staple head in a second staple direction opposite the first staple direction from the head extended position toward the head retracted position.

Embodiment 49. The method of any one of embodiments 47-48, further comprising moving the staple head in the second staple direction, wherein a second rung adjacent the first rung passes over the ramp surface of the indexing tab.

Embodiment 50. The method of embodiment 49, wherein the second rung passes over the ramp surface of the indexing tab while moving the indexing member in the first indexing direction from the member extended position to the member retracted position.

Embodiment 51. The method of embodiment 50, comprising further moving the staple head in the second staple direction, wherein a third rung adjacent the second rung passes over the ramp surface of the indexing tab.

Embodiment 52. The method of embodiment 51, wherein the third rung passes over the ramp surface of the indexing tab while continuing to move the indexing member in the first indexing direction from the member extended position to the member retracted position.

Embodiment 53. The method of any one of embodiments 47-52, wherein the method can further comprise adjusting the member extended position to adjust a cut location of the staple chain.

Embodiment 54. The method of any one of embodiments 47-53, wherein the method can further comprise feeding a portion of the staple chain through a staple chain slot by the continuing to move the staple head in the first staple direction.

Embodiment 55. The method of embodiment 54, wherein the method can further comprise preventing the portion of the staple chain that passed through the staple chain slot from exiting the staple chain slot.

Embodiment 56. The method of embodiment 54, wherein the method can further comprise moving the indexing tab to a disengagement position, and then pulling the staple chain out of the staple chain slot.

It should be understood that while various embodiments have been described in detail with respect to certain illustrative and specific examples thereof, the present disclosure should not be considered limited to such, as numerous modifications and combinations of the disclosed features are possible without departing from the scope of the following claims.

What is claimed is:

1. A staple apparatus comprising:
- a staple head movable in a first staple direction from a head retracted position to a head extended position; and
- an indexing apparatus comprising:
  - an index biasing member; and
  - an indexing member positioned at least partially within an indexing area and biased with the index biasing member toward a member extended position relative to the indexing area, the indexing member being movable in a first indexing direction from the member extended position to a member retracted position relative to the indexing area, wherein the first indexing direction comprises a directional component in the first staple direction, the indexing member defining a rung travel path and further comprising an indexing tab comprising a ramp surface positioned to taper the rung travel path in the first indexing direction, and the indexing tab further comprising a shoulder positioned past at least a portion of the ramp surface in the first indexing direction.

2. The staple apparatus of claim 1, wherein the indexing apparatus further comprises a cover member at least partially defining the indexing area, the cover member comprising a staple chain slot passing through the cover member to the indexing area.

3. The staple apparatus of claim 2, wherein the cover member includes a plurality of grooves extending in the first indexing direction and facing the indexing area, the plurality of grooves comprising a first pair of grooves.

4. The staple apparatus of claim 3, wherein the plurality of grooves further comprises a second pair of grooves.

5. The staple apparatus of claim 2, wherein the cover member further comprises a rung tab comprising a ramp to permit passage of a rung of a staple chain over the rung tab when feeding a portion of the staple chain into the staple chain slot and the rung tab further comprises a shoulder to inhibit passage of the rung of the staple chain back over the rung tab to inhibit a movement of the portion of the staple chain out of the staple chain slot.

6. The staple apparatus of claim 5, wherein the cover member comprises a plurality of rung tabs arranged in a row extending in a direction transverse to the first indexing direction.

7. The staple apparatus of claim 6, wherein the plurality of rung tabs comprises three rung tabs.

8. The staple apparatus of claim 1, wherein a portion of the indexing tab extends through an opening in a body of the indexing member.

9. The staple apparatus of claim 8, wherein the indexing tab is movable relative to the body from an engagement position in which the ramp surface tapers the rung travel path to a disengagement position in which the taper of the rung travel path is reduced.

10. The staple apparatus of claim 9, wherein the indexing member further comprises a tab biasing member, wherein the indexing tab is biased by the tab biasing member toward the engagement position.

11. The staple apparatus of claim 10, wherein the tab biasing member comprises a torsion spring.

12. The staple apparatus of claim 8, wherein the indexing tab is rotatably mounted relative to the body of the indexing member.

13. The staple apparatus of claim 1, wherein the indexing member comprises a plurality of indexing tabs.

14. The staple apparatus of claim 13, wherein a first pair of the plurality of indexing tabs is arranged in a column extending in the first indexing direction.

15. The staple apparatus of claim 14, wherein a second pair of the plurality of indexing tabs are arranged in a row extending in a direction transverse to the first indexing direction.

16. The staple apparatus of claim 1, wherein the indexing apparatus further comprises a stop device including a shoulder configured to move relative to the indexing member to engage a portion of the indexing member to reduce a length of a stroke of the indexing member between the member extended position and the member retracted position.

17. The staple apparatus of claim 16, wherein the portion of the indexing member comprises a protrusion extending within a stroke path.

18. The staple apparatus of claim 17, wherein the stop device comprises a protrusion configured to be moved into the stroke path to reduce an effective length of the stroke path that reduces the length of the stroke of the indexing member.

19. The staple apparatus of claim 16, wherein the shoulder of the stop device is configured to move relative to the indexing member to engage the portion of the indexing member to reduce an extent that the indexing member extends to the member extended position.

20. The staple apparatus of claim 1, further comprising a staple chain positioning apparatus comprising a push member comprising an abutment surface configured to abut an abutment surface of the indexing member to adjust an extent that the indexing member retracts relative to the indexing area when the staple head is in the head retracted position.

21. The staple apparatus of claim 20, wherein the push member is movable in an extension direction comprising a directional component in the first indexing direction.

22. The staple apparatus of claim 2, wherein the staple chain positioning apparatus further comprises a slide member configured to slide in a slide direction transverse to the extension direction, wherein an interface between the slide member and the push member causes movement of the push member in the extension direction in response to movement of the slide member in the slide direction, and the interface comprises an interface protrusion positioned within an interface slot.

23. The staple apparatus of claim 22, wherein the push member comprises the interface protrusion and the slide member comprises the interface slot.

24. The staple apparatus of claim 22, wherein the staple chain positioning apparatus further comprises a cover member comprising a cover slot extending in the slide direction, and the slide member comprises a positioning protrusion extending through the cover slot of the cover member of the staple chain positioning apparatus.

25. The staple apparatus of claim 1, wherein the index biasing member comprises an extension spring.

26. A method of feeding a staple chain with the staple apparatus of claim 1, the method comprising:

moving the staple head in the first staple direction from the head retracted position while the index biasing member biases the indexing member to move relative to the staple head in a second indexing direction opposite the first indexing direction from the member retracted position to the member extended position; and continuing to move the staple head in the first staple direction such that the indexing member and a first rung of the staple chain engaging the shoulder of the indexing tab are moved together with the staple head in the first staple direction toward the head extended position.

27. The method of claim 26, further comprising adjusting a length of a stroke of the indexing member to change a number of rungs of the staple chain that pass over the ramp surface of the indexing tab when moving the staple head in a second staple direction opposite the first staple direction from the head extended position toward the head retracted position.

28. The method of claim 27, further comprising moving the staple head in the second staple direction, wherein a second rung adjacent to the first rung passes over the ramp surface of the indexing tab.

29. The method of claim 28, wherein the second rung passes over the ramp surface of the indexing tab while moving the indexing member in the first indexing direction from the member extended position to the member retracted position.

30. The method of claim 29, comprising further moving the staple head in the second staple direction, wherein a third rung adjacent to the second rung passes over the ramp surface of the indexing tab.

31. The method of claim 30, wherein the third rung passes over the ramp surface of the indexing tab while continuing to move the indexing member in the first indexing direction from the member extended position to the member retracted position.

32. The method of claim 26, further comprising adjusting the member extended position to adjust a cut location of the staple chain.

33. The method of claim 26, further comprising feeding a portion of the staple chain through a staple chain slot by continuing to move the staple head in the first staple direction.

34. The method of claim 33, further comprising preventing the portion of the staple chain that is fed through the staple chain slot from exiting the staple chain slot.

35. The method of claim 33, further comprising moving the indexing tab to a disengagement position, and then pulling the staple chain out of the staple chain slot.

36. An indexing apparatus for indexing a staple chain, the indexing apparatus comprising:

a support member;

an index biasing member;

an indexing member positioned at least partially within an indexing area and biased with the index biasing member toward a member extended position relative to the indexing area, the indexing member being movable in a first indexing direction from the member extended position to a member retracted position relative to the indexing area, the indexing member defining a rung travel path and further comprising an indexing tab comprising a ramp surface positioned to taper the rung travel path in the first indexing direction, and the indexing tab further comprising a shoulder positioned past at least a portion of the ramp surface in the first indexing direction, wherein the indexing apparatus further comprises a cover member comprising a staple chain slot passing through the cover member to the indexing area, wherein the indexing area is defined between the support member and the cover member, and wherein the cover member includes a plurality of grooves extending in the first indexing direction and facing the indexing area, the plurality of grooves comprising a first pair of grooves.

37. The indexing apparatus of claim 36, wherein the plurality of grooves further comprises a second pair of grooves.

38. The indexing apparatus of claim 36, wherein the cover member further comprises a rung tab comprising a ramp to permit passage of a rung of a staple chain over the rung tab when feeding a portion of the staple chain into the staple chain slot, and the rung tab further comprises a shoulder to inhibit passage of the rung of the staple chain back over the rung tab to inhibit a movement of the portion of the staple chain out of the staple chain slot.

39. The indexing apparatus of claim 38, wherein the cover member comprises a plurality of rung tabs arranged in a row extending in a direction transverse to the first indexing direction.

40. The indexing apparatus of claim 39, wherein the plurality of rung tabs comprises three rung tabs.

41. The indexing apparatus of claim 36, wherein a portion of the indexing tab extends through an opening in a body of the indexing member.

42. The indexing apparatus of claim 41, wherein the indexing tab is movable relative to the body from an engagement position in which the ramp tapers the rung travel path to a disengagement position in which the taper of the rung travel path is reduced.

43. The indexing apparatus of claim 42, wherein the indexing tab is biased by a tab biasing member toward the engagement position.

44. The indexing apparatus of claim 43, wherein the tab biasing member comprises a torsion spring.

45. The indexing apparatus of claim 41, wherein the indexing tab is rotatably mounted relative to the body of the indexing member.

46. The indexing apparatus of claim 36, wherein the indexing member comprises a plurality of indexing tabs.

47. The indexing apparatus of claim 46, wherein a first pair of the plurality of indexing tabs is arranged in a column extending in the first indexing direction.

48. The indexing apparatus of claim 47, wherein a second pair of the plurality of indexing tabs is arranged in a row extending in a direction transverse to the first indexing direction.

49. The indexing apparatus of claim 36, further comprising a stop device including a shoulder configured to move relative to the indexing member to engage a portion of the indexing member to reduce a length of a stroke of the indexing member between the member extended position and the member retracted position.

50. The indexing apparatus of claim 49, wherein the portion of the indexing member comprises a protrusion extending within a stroke path.

51. The indexing apparatus of claim 50, wherein the stop device comprises a protrusion configured to be moved into the stroke path to reduce an effective length of the stroke path that reduces the length of the stroke of the indexing member.

52. The indexing apparatus of claim 49, wherein the shoulder of the stop device is configured to move relative to the indexing member to engage the portion of the indexing member to reduce an extent that the indexing member extends to the member extended position.

* * * * *